(12) United States Patent
May

(10) Patent No.: US 9,086,163 B2
(45) Date of Patent: Jul. 21, 2015

(54) CONTROLLING FLUID FLOW

(75) Inventor: Lamar E. May, Tooele, UT (US)

(73) Assignee: Dresser, Inc., Addison, TX (US)

( * ) Notice: Subject to any disclaimer, the term of this patent is extended or adjusted under 35 U.S.C. 154(b) by 1064 days.

(21) Appl. No.: 13/082,941

(22) Filed: Apr. 8, 2011

(65) Prior Publication Data

US 2011/0259448 A1 Oct. 27, 2011

Related U.S. Application Data

(60) Provisional application No. 61/328,326, filed on Apr. 27, 2010.

(51) Int. Cl.
*F16K 17/00* (2006.01)
*F16K 17/32* (2006.01)
*F16K 17/164* (2006.01)

(52) U.S. Cl.
CPC .............. *F16K 17/32* (2013.01); *F16K 17/00* (2013.01); *F16K 17/164* (2013.01)

(58) Field of Classification Search
USPC ........... 137/458, 463, 465, 464, 14, 456, 536, 137/540, 542, 543.21, 559; 251/74
See application file for complete search history.

(56) References Cited

U.S. PATENT DOCUMENTS

| | | | | |
|---|---|---|---|---|
| 1,071,431 A | * | 8/1913 | Keller | 137/543.23 |
| 2,327,055 A | * | 8/1943 | McMahon | 137/458 |
| 2,638,928 A | | 5/1953 | Stadler | |
| 3,021,866 A | * | 2/1962 | Handley | 137/458 |
| 3,429,321 A | * | 2/1969 | Thrall | 137/77 |
| 3,635,239 A | | 1/1972 | Farrer | |
| 4,067,095 A | * | 1/1978 | Cameron | 29/890.126 |
| 4,457,334 A | | 7/1984 | Becker et al. | |
| 5,709,239 A | | 1/1998 | Macalello et al. | |
| 6,112,764 A | * | 9/2000 | Engdahl et al. | 137/554 |

FOREIGN PATENT DOCUMENTS

| GB | 2007332 A | 5/1979 |
|---|---|---|
| JP | S61-103677 | 7/1986 |

OTHER PUBLICATIONS

Fisher Controls International, Inc., "Type OSE Slam-Shut Valve", Bulletin 71.6:OSE, published 1997, 12 pages.
Emerson Process Management, Fisher Controls International, "Type OS2 Slam Shut Device", Instruction Manual Form 5668, published Mar. 2001, 20 pages.
Emerson Process Management, "BM5 series Slam shut valves", published at least as early as Apr. 26, 2010, 12 pages.
U.S. Appl. No. 13/089,655, filed Apr. 19, 2011, titled "Pneumatic Controlled Slam Shut Valve."
International Search Report and Written Opinion issued in connection with corresponding PCT Application No. PCT/US2011/032523 dated Nov. 29, 2011.

\* cited by examiner

*Primary Examiner* — Kevin Lee
*Assistant Examiner* — P. Macade Nichols
(74) *Attorney, Agent, or Firm* — Paul Frank + Collins PC

(57) ABSTRACT

Some embodiments of a shutoff valve system for a fluid flow system can include a plug assembly that is biased to adjust from a first position in which the fluid flow path is open to a second position in which the fluid flow path is closed. The plug assembly may automatically adjust from the first position to the second position in response to a downstream pressure condition.

34 Claims, 13 Drawing Sheets

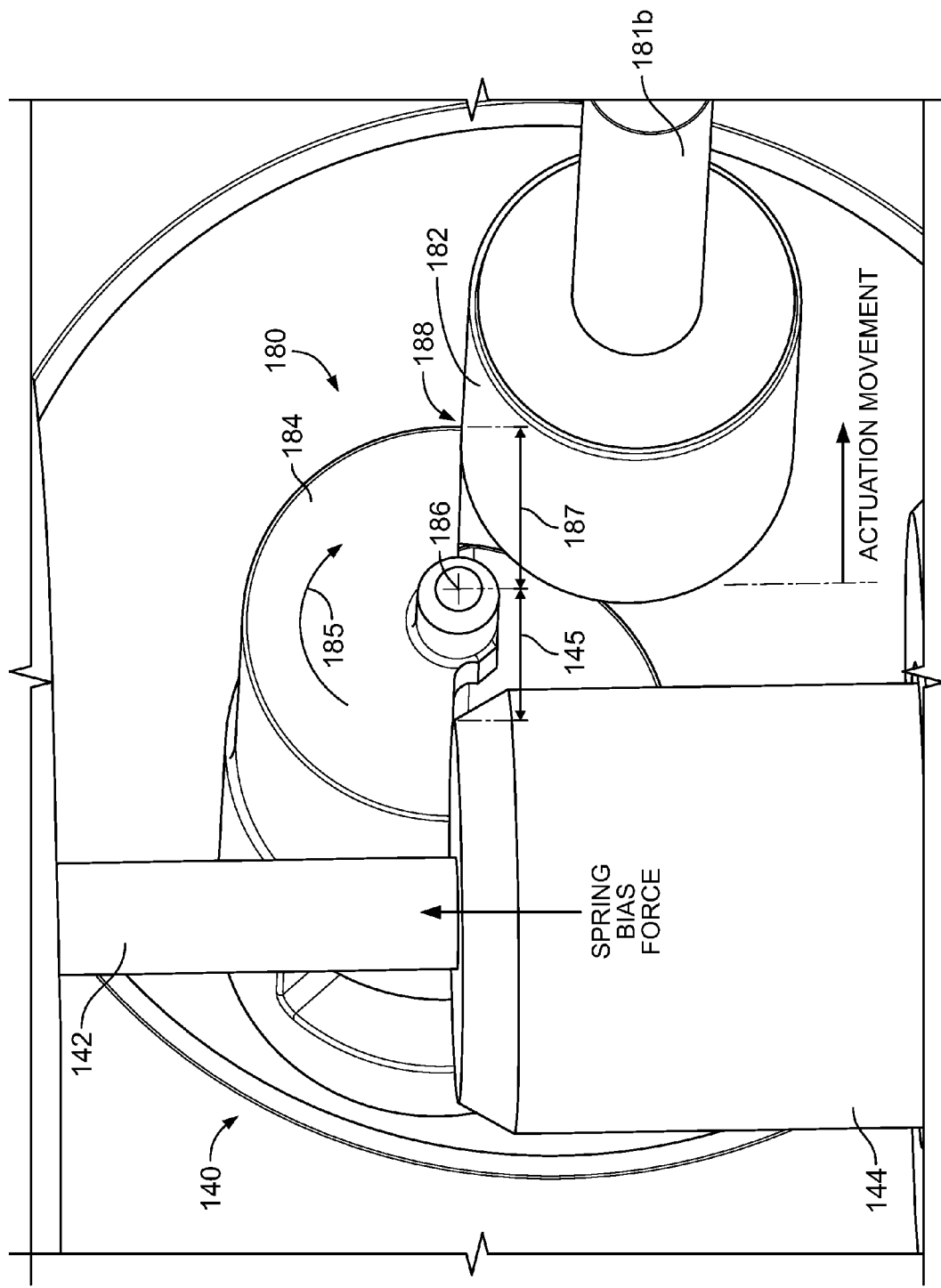

CONTROLLING FLUID FLOW

CLAIM OF PRIORITY

This application claims priority under 35 U.S.C. §119(e) to U.S. Provisional Patent Application Ser. No. 61/328,326 filed on Apr. 27, 2010 and entitled "Controlling Fluid Flow," the contents of which are fully incorporated herein by reference.

TECHNICAL FIELD

This document relates to systems and methods for controlling fluid flow, for example, in a natural gas distribution network or other fluid systems in which fluid flow may be shut off.

BACKGROUND

Some fluid flow systems, such as a natural gas distribution network, maintain fluids in a predetermined pressure range for purposes of distribution and safety. For example, in a natural fluid system, a gas leak or other safety issue may arise if a gas pipe or other structure is damaged at a downstream location. In such circumstances, a shutoff valve may be installed at an upstream location in the fluid flow system for the purpose of rapidly halting the fluid flow when the downstream pressure is detected to be higher than a selected set point (e.g., overpressure condition) or lower than a selected set point (underpressure condition). These shutoff valves are sometimes referred to as "slam-shut" valves. In some instances, a slam-shut valve may be installed immediately after a filter and prior to a pressure regulator, and the valve normally remains open during its useful life. If there is a catastrophic event at a downstream location, the slam-shut valve may respond to the change in the down stream pressure by immediately shutting off the fluid flow to the downstream location. When the fluid flow system is repaired or otherwise restored for normal fluid flow, the slam-shut valve may be reset through a complex manual process. After the fluid flow resumes through the slam-shut valve, the fluid flow will continue through the open valve so long as the sensed downstream pressure remains within the selected range.

SUMMARY

Some embodiments of a shutoff valve system for a fluid flow system can include an actuation assembly that triggers the valve system to close both in response to an underpressure condition and in response to a sensed overpressure condition. In some embodiments, the actuation assembly comprises a sensor assembly and a plug assembly that automatically adjusts from an open position to a closed position in response to a downstream pressure condition that is detected by the sensor assembly. In response to any of the underpressure condition and the overpressure condition, the sensor assembly may activate a trigger assembly that releases the plug assembly to travel to the closed position and thereby seal the flow path between the inlet and the outlet.

In particular embodiments, a shutoff valve system for a fluid flow system may include a fluid flow path at least partially defined by an inlet and an outlet. The system may also include a plug assembly that is biased to adjust from a first position in which the fluid flow path is open to a second position in which the fluid flow path is closed. The system may further include a trip mechanism having a trigger member that is moved in response to a pressure condition. The plug assembly may automatically adjust from the first position to the second position in response to movement of the trigger member. In some aspects, the trigger member may be moved in response to an underpressure condition and in response to an overpressure condition.

In some embodiments, a shutoff valve system for a fluid flow system includes a fluid flow path at least partially defined by an inlet and an outlet. The system may also include a plug assembly that is biased to move from a first position in which the fluid flow path is open to a second position in which the fluid flow path is closed. The system may also include a sensor assembly having a trigger member that is coupled to a first sensing diaphragm and a second sensing diaphragm. The plug assembly may automatically move in a linear path from the first position to the second position in response to an underpressure condition on the first sensing diaphragm and in response to an overpressure condition on the second sensing diaphragm.

In particular embodiments, a valve system to shutoff fluid flow in a fluid flow system may include a fluid flow path at least partially defined by an inlet and an outlet. The system may also include a plug assembly that is biased to move from a first position in which the fluid flow path is open to a second position in which the fluid flow path is closed. The system may further include a trip mechanism that retains the plug assembly in the first position and, in response to a downstream fluid pressure condition, releases the plug assembly to travel in a linear path from the first position to the second position. The trip mechanism may comprise a rotator shaft that is pivotable about a pivot axis and a trip shaft that is movable relative to the rotator shaft. At least a first shaft portion of the plug assembly may contact the rotator shaft to urge the rotator shaft to pivot while the trip shaft contacts the rotator shaft to resist rotation of the rotator shaft. The trip shaft may move away from the rotator shaft in response to the downstream pressure condition so that the trip mechanism releases the plug assembly to move in a linear path from the first position to the second position.

In some embodiments, a slam-shut valve assembly may include a plug assembly that is biased to move in a longitudinal direction from a first position to a second position for closing a fluid flow path. The assembly may also include a trigger member positioned proximate to a component of the plug assembly. The trigger member may be movable so as to release the plug assembly to travel toward the second position in response to a sensed pressure condition. The assembly may also include first and second sense diaphragms positioned in a lateral direction relative to the trigger member such that the trigger member is position generally laterally between the first and second sense diaphragms. The assembly may also include a first compression spring positioned laterally outside of the first sense diaphragm and opposite of the trigger member such that the first compression spring biases the first sense diaphragm toward the trigger member. The assembly may also include a second compression spring positioned laterally outside of the second sense diaphragm and opposite of the trigger member such that the second compression spring biases the second sense diaphragm toward the trigger member.

In particular embodiments, a slam-shut valve system may include a fluid flow path at least partially defined by an inlet and an outlet. The system may also include a seat positioned along the flow path. The system may also include a plug assembly that is biased to move from a first position in which the fluid flow path is open to a second position in which the fluid flow path is closed. The plug assembly may include a plug head to mate with the seat when the plug assembly is moved to the second position. The plug assembly may also include a spring holder member having an inner cylindrical surface portion and an outer cylindrical surface portion. The plug assembly may include a spring at least partially positioned in the spring holder member. The plug head may slidably engage with both the inner and outer cylindrical surface portions of the spring holder member.

In some embodiments, a shutoff valve system for a fluid flow system may include a fluid flow path at least partially defined by an inlet and an outlet. The system may also include a seat positioned along the flow path. The system may also include a linearly movable plug assembly that, in response to a downstream pressure condition, automatically adjusts along a linear path from a first position in which the fluid flow path is open to a second position in which the fluid flow path is closed. The plug assembly may include a plug head to mate with the seat when the plug assembly is moved to the second position and at least one shaft coupled to the plug head, and (in particular embodiments) only a single ring seal member may engage with the entire linearly movable plug assembly.

In other embodiments, a slam-shut valve system may include a regulator body that defines a fluid flow path between an inlet and an outlet. The system may also include a seat positioned along the flow path. The system may also include a slam shut valve assembly having a sensor assembly to detect a downstream pressure condition and a plug assembly to mate with the seat when, in response to the downstream pressure condition, the plug assembly is automatically adjusted from a first position in which the fluid flow path is open to a second position in which the fluid flow path is closed. The entire slam shut valve assembly may be removably coupled to the regulator body using only two mounting bolts.

In some embodiments, a slam-shut valve assembly may include a plug assembly that is biased to move in a longitudinal direction from a first position to a second position for closing a fluid flow path. The assembly may also include a trip mechanism to releasably engage with a component of the plug assembly, wherein in response to a downstream pressure condition. The trip mechanism may automatically adjust to release the plug assembly move to the second for closing the fluid flow path. The assembly may also include a viewing window that provides an externally visible indicator of the trip mechanism releasing the plug assembly to move to the second position.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 7 is a perspective view of a portion of a trip mechanism of the shutoff valve system of FIG. 1.

Like reference symbols in the various drawings indicate like elements.

DETAILED DESCRIPTION OF ILLUSTRATIVE EMBODIMENTS

Figure 1:
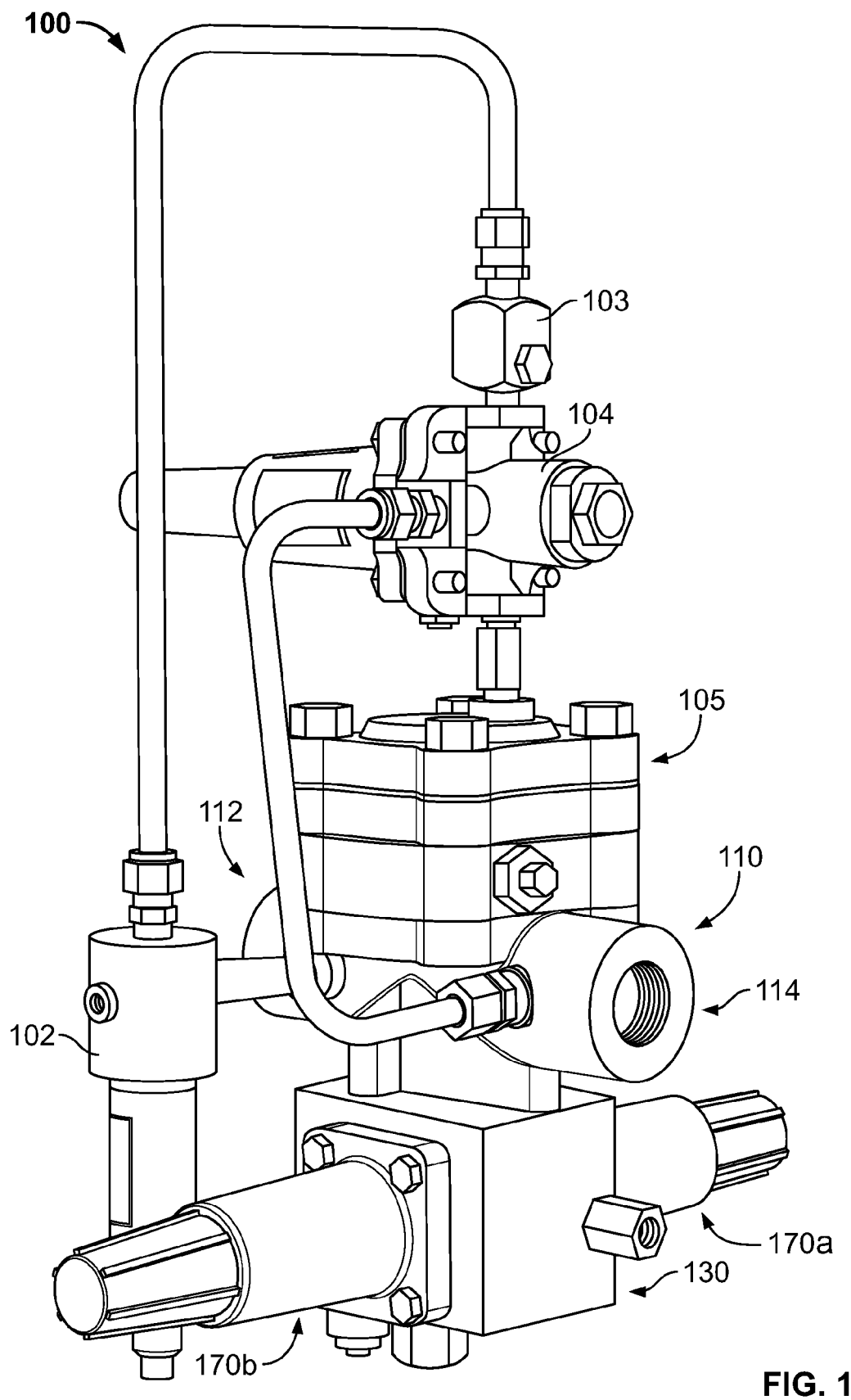
FIG. 1 is a perspective view of a shutoff valve system in accordance with particular embodiments.
Figure 2:
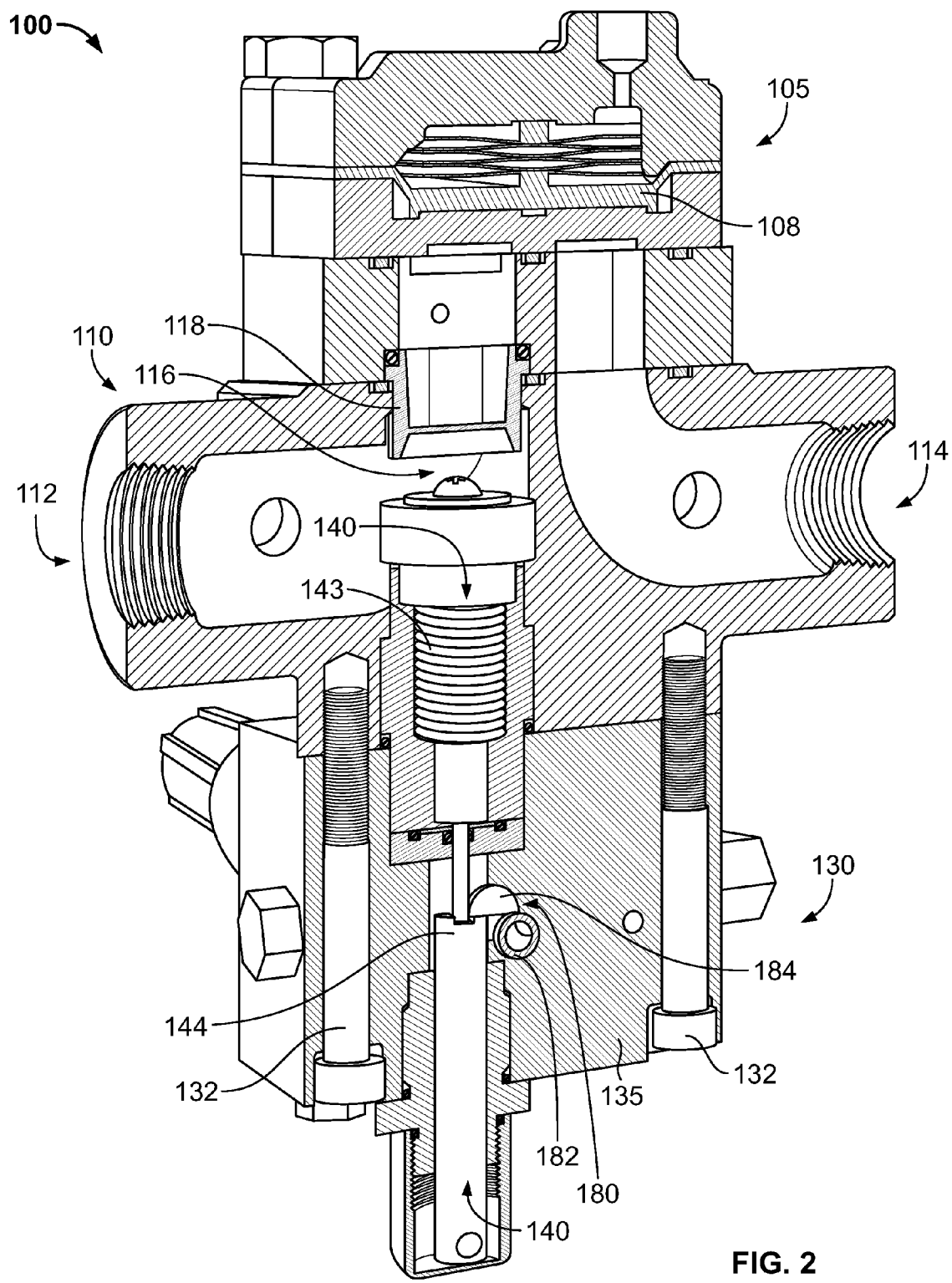
FIG. 2 is a sectional view of the shutoff valve system of FIG. 1.
Figure 3:
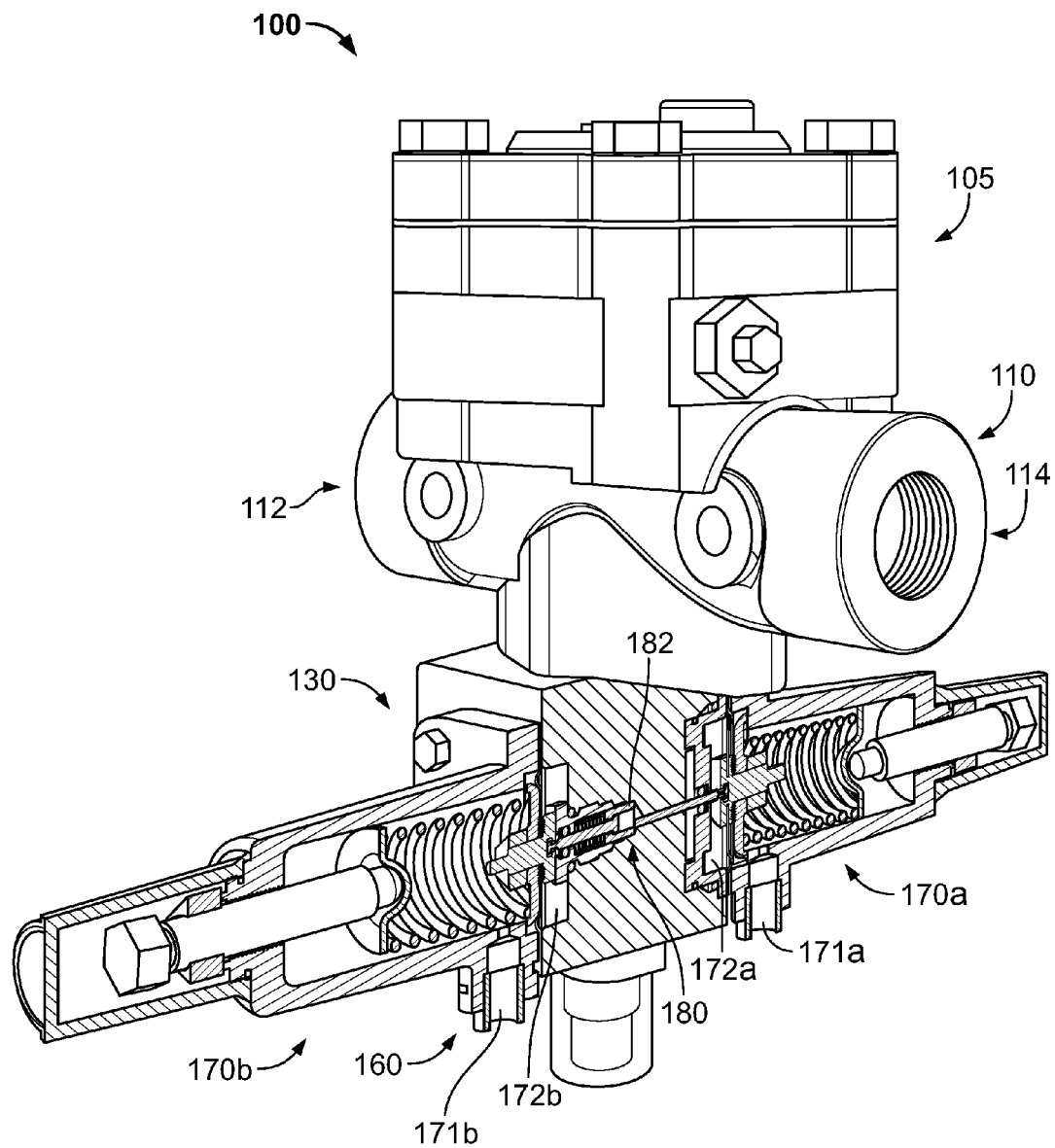
FIG. 3 is another section view of the shutoff valve system of FIG. 1.

Referring to FIGS. 1-3, some embodiments of a shutoff valve system 100 for a fluid flow system can include a plug assembly 140 (FIG. 2) that is biased to adjust from a first position in which the fluid flow path is open to a second position in which the fluid flow path is closed. In particular embodiments, the plug assembly 140 may automatically adjust from the first position to the second position in response to a downstream pressure condition that is detected by a sensor assembly 160 (FIG. 3). For example, the sensor assembly 160 of the shutoff valve system 100 may be responsive to both overpressure and underpressure conditions, and each of overpressure and underpressure set points may be readily adjusted by a user during or after installation. In response to any of the underpressure condition and the overpressure condition, the sensor assembly 160 may activate a trip mechanism that releases the plug assembly 140 to travel from the first position to the second position to thereby seal the flow path between the inlet 112 and the outlet 114.

In some embodiments, the shutoff valve system 100 includes a regulator assembly 105 and a body assembly 110 through which a fluid (e.g., natural gas) can flow and an actuator assembly 130 removably coupled to the body assembly 110. The actuator assembly 130, which in this embodiment acts as a slam-shut valve assembly, is configured to sense a pressure condition somewhere within the fluid flow system (e.g., a downstream pressure condition located downstream from the outlet 114) such that the valve system 100 can protect a portion of the fluid flow system from over and underpressurization. For example, the shutoff valve system 100 can be positioned between a natural gas source and natural gas consuming equipment. In a case where the natural fluid system is damaged downstream from the shutoff valve system 100, natural gas can be free to escape and thereby cause an increased likelihood of a catastrophic failure or other safety risk. The shutoff valve system 100 can be configured to sense this underpressure situation and promptly slam shut, thus stopping the flow of natural gas through the valve system 100 and preventing the natural gas at the inlet 112 from advancing through the shutoff valve system 100. In another example, a failure in the regulation of the pressure of natural gas can cause the downstream pressure to be too high. Such an overpressure condition can cause damage to equipment in the natural gas distribution network and potentially cause a catastrophic failure. Here again, the shutoff valve system 100 can be configured to sense this overpressure condition and promptly slam shut, thus stopping the flow of natural gas through the valve system 100 and preventing the natural gas at the inlet 112 from advancing through the shutoff valve system 100.

Still referring to FIGS. 1-3, the body assembly 110 can include an inlet 112 into which a fluid (e.g., natural gas in some embodiments) is delivered from a pressurized source and an outlet 114 that can supply the fluid to downstream consuming equipment. Between the inlet 112 and outlet 114, the body assembly can include a valve chamber 116 (FIG. 2), in which a valve seat 118 is positioned to sealingly receive a portion of the actuator assembly 130 (e.g., the moveable plug assembly 140) to thereby stop the fluid flow from the inlet 112 to the outlet 114. In the depicted embodiment, the actuator assembly operates as a slam shut valve that provides a bubble tight shutoff (FCI Class VI or better) such that when the pressure sensing assembly of the actuator assembly 130 detects any of an overpressure condition and an underpressure situation, the plug assembly 140 can be quickly transitioned from an open position to a closed position within the chamber 116 (e.g., against the seat 118), thus fluidly isolating the inlet 112 from the outlet 114.

As shown in FIG. 1, the shutoff valve system 100 may have a number of external components coupled thereto as part of the fluid flow system. For example, in this embodiment in which the fluid flow system is a natural gas distribution network, a filter 102 may be connected proximate the inlet 112. The filter 102 may have a line that extends to a restrictor 103, which is in turn coupled to a pilot 104. The pilot 104 attached to an upper portion of the regulator assembly 105 of the shutoff valve system 100. The regulator assembly 105 can act as a pressure regulator for the fluid flow between the inlet 112 and the outlet 144. For example, the pressure regulator 105 may include a diaphragm 108 (FIGS. 2 and 4) that regulates the fluid flowing between the inlet 112 and the outlet 114.

In some embodiments, the shutoff valve system 100 includes features that may advantageously increase the operational life of the system 100, decrease costs associated with maintaining the system 100, and the like. For example, the system 100 can be configured such that the actuator assembly 130 can be coupled to the body assembly 110 using only two cap screws 132. Accordingly, a service technician can readily remove the entire actuator assembly 130 from the valve body 110 by removing two screws 132, thereby simplifying the process of servicing or replacing the actuator assembly 130. In another example, the valve system 100 can include features that reduce the force required by the actuator assembly 130 to close the valve system 100, thus reducing the strain on the actuator assembly 130 and minimizing costs. Examples of such a configuration are described below in connection with FIGS. 6A-7. In another example, wear of the internal components of the actuator assembly 130 can be minimized such that less frequent maintenance, and thus operating costs, can be reduced. Furthermore, the valve system 100 can include features that reduce the number of wear items internal to the valve system 100, thus reducing the likelihood of failure, extending the duration between servicing, and reducing costs.

Referring now to FIGS. 2-3, the actuator assembly 130 can include the plug assembly 140 moveable within the chamber 116 from an open position (shown in FIG. 2 where pressurized gas can flow from the inlet 112 to the outlet 114) to a closed position where the inlet 112 and the outlet 114 are substantially fluidly isolated. For example, the plug assembly 140 can be biased toward a closed position (FIG. 6B) while being retained in an opened position (FIG. 6A) by a trigger assembly 180 of the pressure sensing assembly 160. When the pressure sensing assembly 160 detects an overpressure or underpressure condition at a downstream location, the trigger assembly 180 can release the plug assembly 140 to quickly transition from the opened position (FIG. 6A) to a closed position (FIG. 6B) where a portion of the plug assembly 140 abuts the seat 118 of the chamber 116. When the portion of the plug assembly abuts the seat 118, the fluid flow between the inlet 112 and the outlet 114 is shutoff until the valve system 100 is subsequently reset.

Figure 6A:
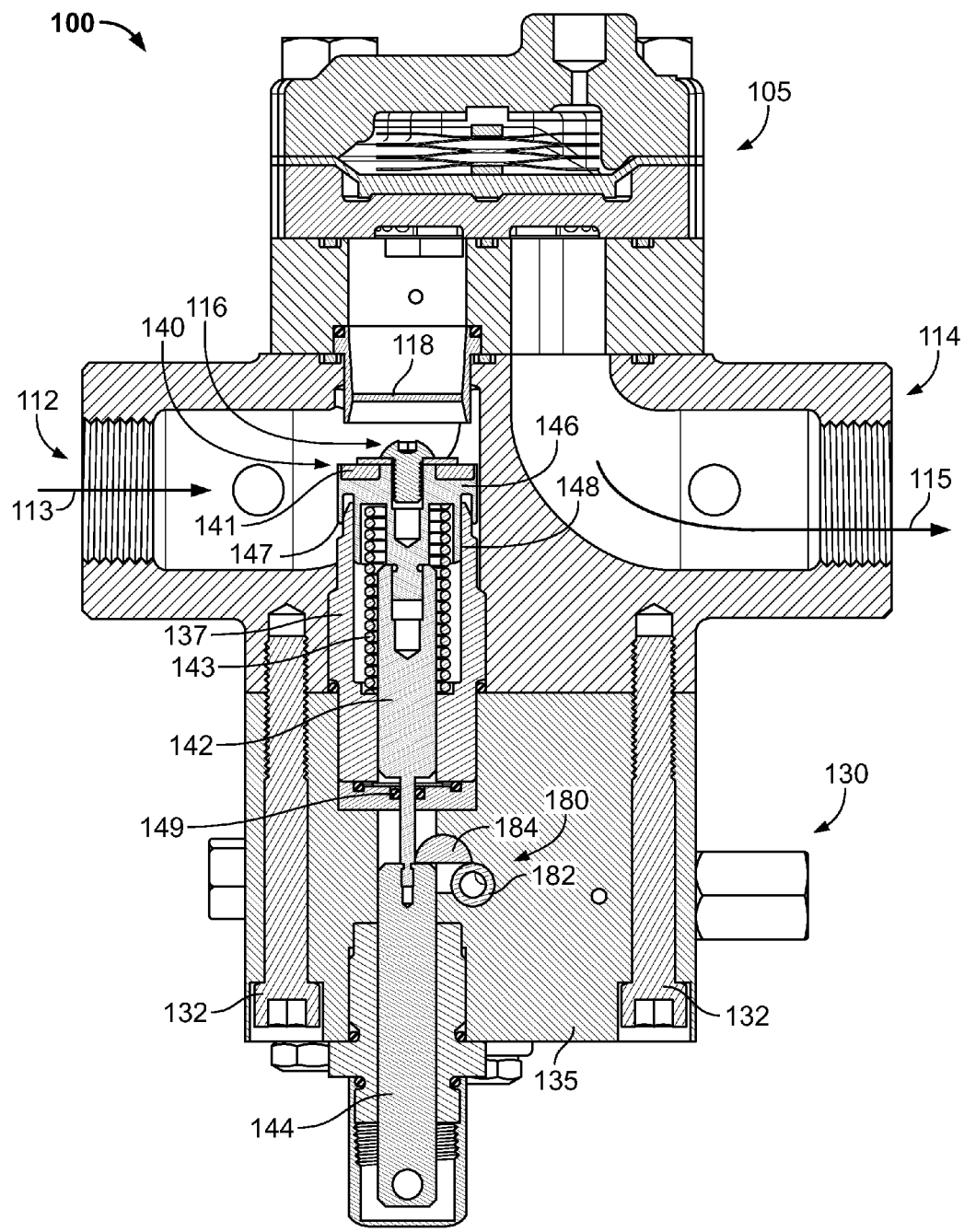
FIG. 6A is a cross-sectional view of the shutoff valve system of FIG. 1 in a flow open position.
Figure 6B:
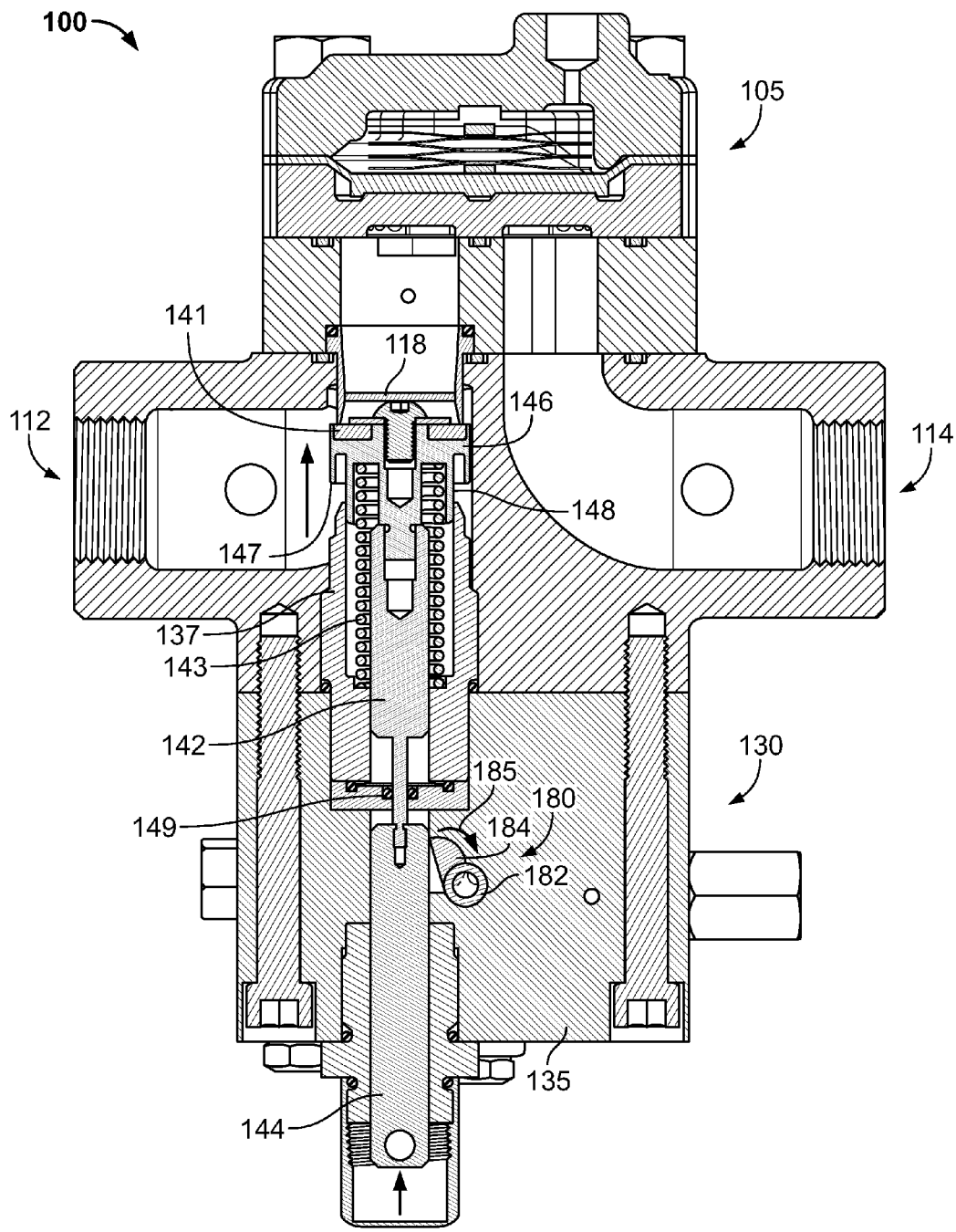
FIG. 6B is a cross-sectional view of the shutoff valve system of FIG. 1 in a flow closed position.

Referring now to FIG. 3, the actuator assembly 130 can also include the sensor assembly 160 that can be configured to retain the plug assembly 140 in the open position in the case where a monitored pressure is within a predetermined range. Also, the sensor assembly 160 can release the plug assembly 140 to transition to the closed position in the event of any of an overpressure condition and an underpressure condition. For example, as will be described in greater detail below, the sensor assembly 160 can include pressure sensing assemblies 170a and 170b and the trigger assembly 180 (FIGS. 2 and 3). In some embodiments, the pressure sensing assemblies 170a and 170b can monitor the pressure of the fluid system at a downstream location by a sense pressure line that is connected to sense pressure chambers 172a and 17b. When the pressure sensing assemblies 170a and 170b are exposed to either an underpressure condition or an overpressure condition, at least one of the pressure sensing assemblies 170a and 170b can cause an actuator member 182 (e.g., a trigger shaft in this embodiment) of the trigger assembly 180 to shift positions and thereby release the plug assembly 140 to travel from the open position (FIG. 6A) to the closed position (FIG. 6B). For example, the first pressure sensing assembly 170a can include the first pressure sense chamber 172a in fluid communication with a portion of the fluid system (e.g., connected to a downstream location) that is to be monitored by the shutoff valve system 100. When pressure within the monitored portion of the fluid system (and thus the pressure within the sense chamber 172a) is equal to or greater than a minimum setpoint value, the trigger member 182 of the trigger assembly 180 remains in a position that retains the plug assembly 140 in the open position (FIG. 6A). When the sensed pressure drops below the minimum setpoint value, the pressure sensing assembly 170a adjusts the position of the trigger member 182 of the trigger assembly 180, which then causes the release of the plug assembly 140 to travel to the closed position (FIG. 6B). In this way, the shutoff valve system 100 can advantageously protect a portion of the fluid system from dangerous underpressure situations. In another example, the second pressure sensing assembly 170b can include a corresponding pressure sense chamber 172b in fluid communication with a portion of the fluid system that is to be monitored by the shutoff valve system 100 (e.g., the interior of the body assembly 110). This can be the same portion of the fluid system that is in communication with the chamber 172a. When pressure within the monitored portion of the fluid system (and thus the pressure within the sense chamber 172b) is equal to or less than a maximum setpoint value, the trigger member of the trigger assembly 180 remains in the position to retain the plug assembly 140 in the open position (FIG. 6A). When the sensed pressure rises above the maximum setpoint value, the pressure sensing assembly 170b adjusts the position of the trigger member 182 of the trigger assembly 180, which then causes the release of the plug assembly 140 to travel to the closed position (FIG. 6B). In this way, the shutoff valve system 100 can advantageously protect a fluid system from both underpressure and overpressure situations.

Figure 9A:
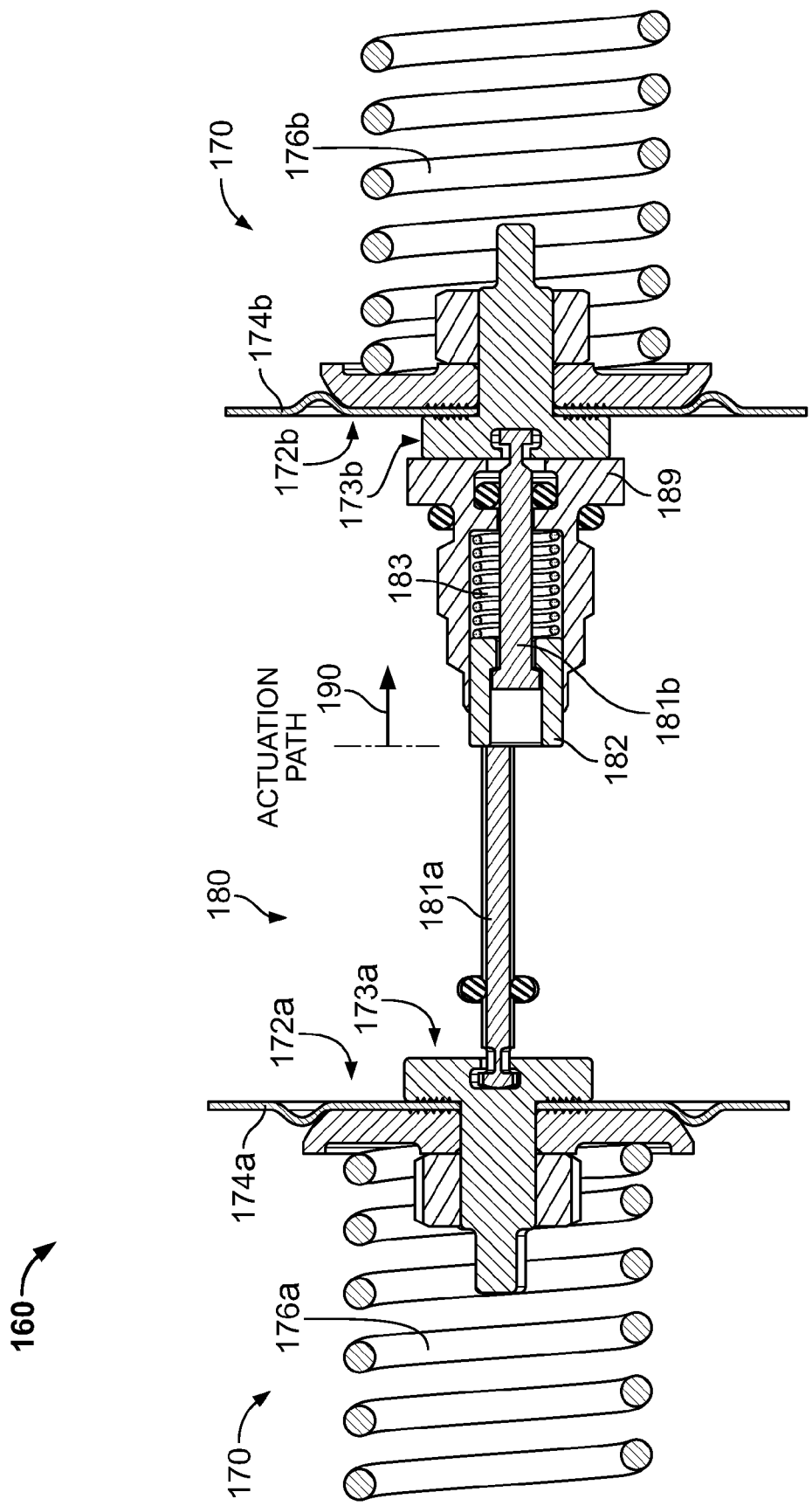
FIG. 9A is a cross-sectional view of a pressure sensing assembly of the shutoff valve system of FIG. 1, with an actuator in a first position.

In some embodiments, the trigger assembly 180 of the actuator assembly 130 can operate as a trip mechanism that is responsive to both underpressure and overpressure conditions. For example, although both the sense chambers 172a and 172b may be fluidly connected to the same portion of the fluid system (e.g., at a downstream location), the first sense chamber 172a, a corresponding first diaphragm 174a (FIG. 9A), and associated components may respond to underpressure conditions by moving the actuator member 182, while the second sense chamber 172b, a corresponding second diaphragm 174b (see FIG. 9A), and associated components may respond to overpressure conditions by moving the actuator member 182. In one example, an underpressure condition in the first chamber 172a may result in a configuration change in the trigger assembly 180 (e.g., sliding the trigger member 182 to a release position), while the same underpressure situation in the second chamber 172b may not cause any configuration change of the trigger assembly 180. Conversely, an overpressure condition in second chamber 172b may result in a configuration change in the trigger assembly 180 (e.g., sliding the trigger member 182 to the release position), while the same overpressure situation in chamber 172a may not cause any configuration change of the trigger assembly 180. In this way, portions 170a and 170b of the actuator assembly 130 can work independently.

Figure 4:
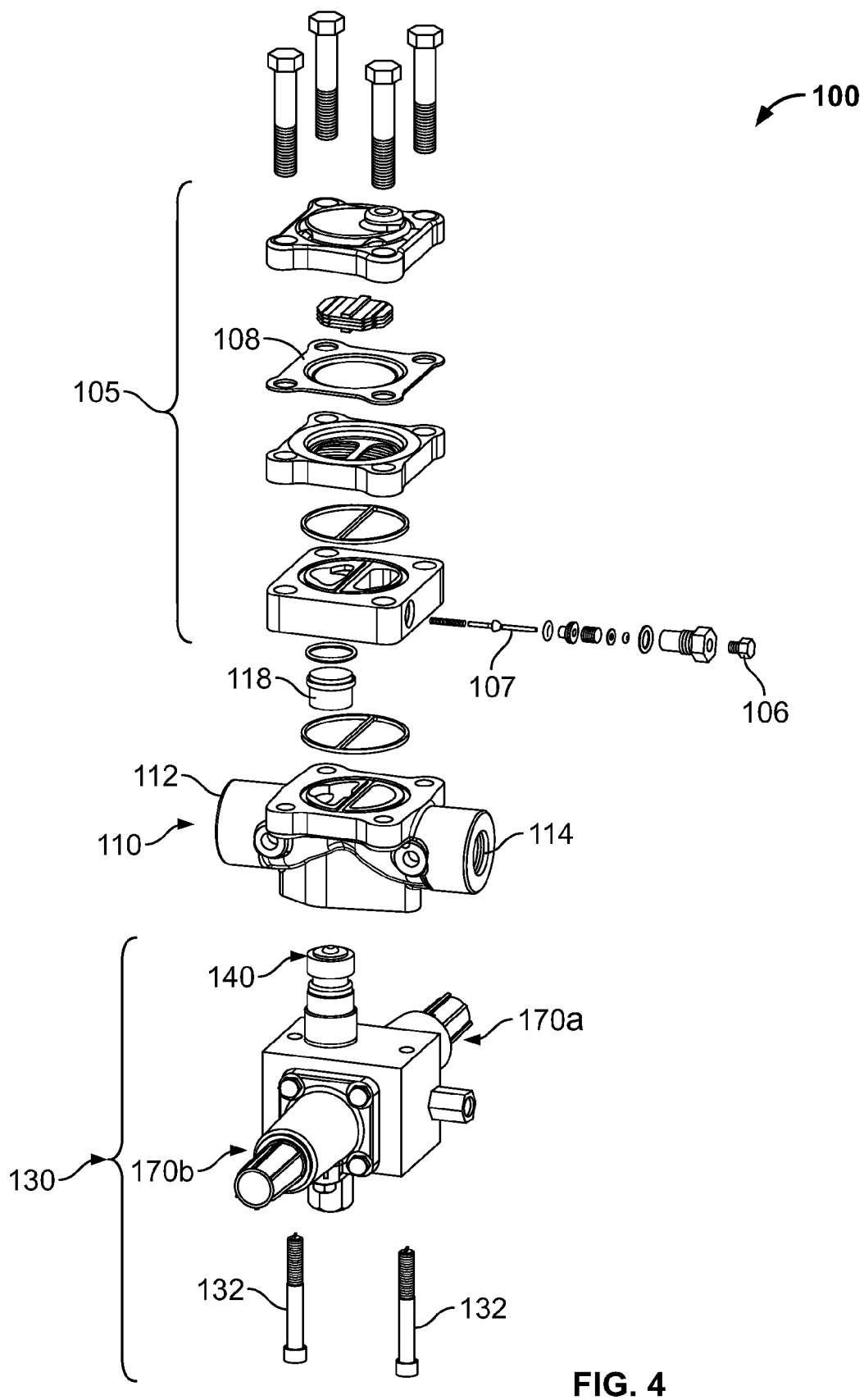
FIG. 4 is an exploded perspective view of the shutoff valve system of FIG. 1.

Referring now to FIG. 4, the body assembly 110 of the valve system 100 defines at least a portion of the fluid flow path through which a gas or fluid can pass. For example, the fluid may pass through the inlet 112 and toward the pressure regulator 105. The fluid flow can cause the diaphragm 108 of the pressure regulator 105 to remain in a flow open position while also regulating the pressure of the fluid advancing toward the outlet 114. As previously described, the actuator 130 can operate as a slam shut valve assembly that is removably mounted to the body 110 of the valve system 100 in a convenient manner. In this embodiment, the actuator assembly 130 is coupled to the body 110 using, for example, only one pair of cap screws 132. As such, the actuator assembly 130 can be readily removed from the body assembly 110 (e.g., for replacement, maintenance, inspection, and the like) by simply removing only two cap screws 132 and without affecting the attachment of the body assembly 110 to the remainder of the valve system 100 and the attached fluid system (e.g., the piping attached at the inlet 112 and outlet 114). For example, the actuator assembly 130 can be removed from the valve system 100 and replaced with a new actuator assembly with only minimal disruption of service.

Figure 5A:
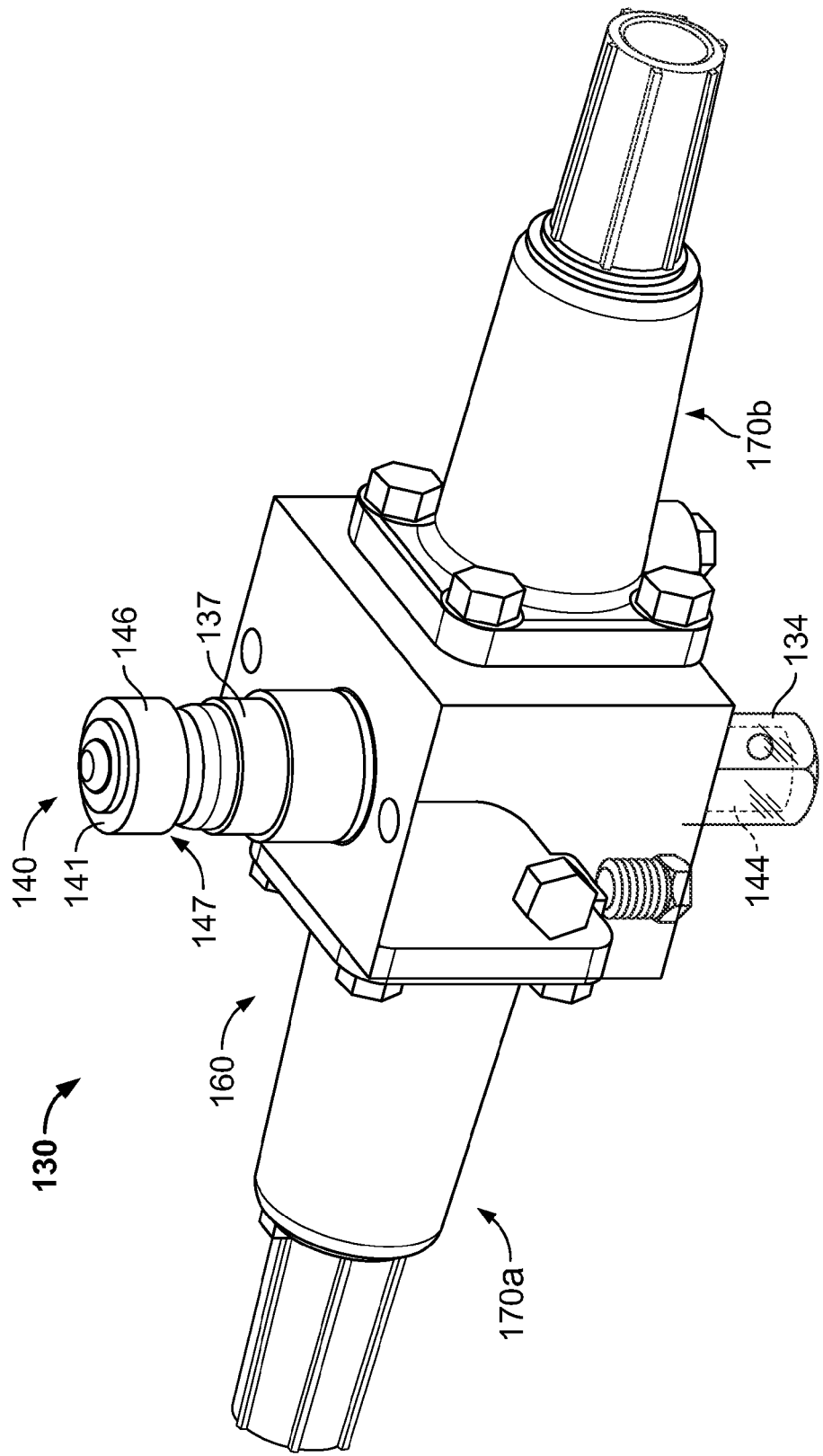
FIG. 5A is a perspective view of a shutoff actuator assembly of the shutoff valve system of FIG. 1.
Figure 5B:
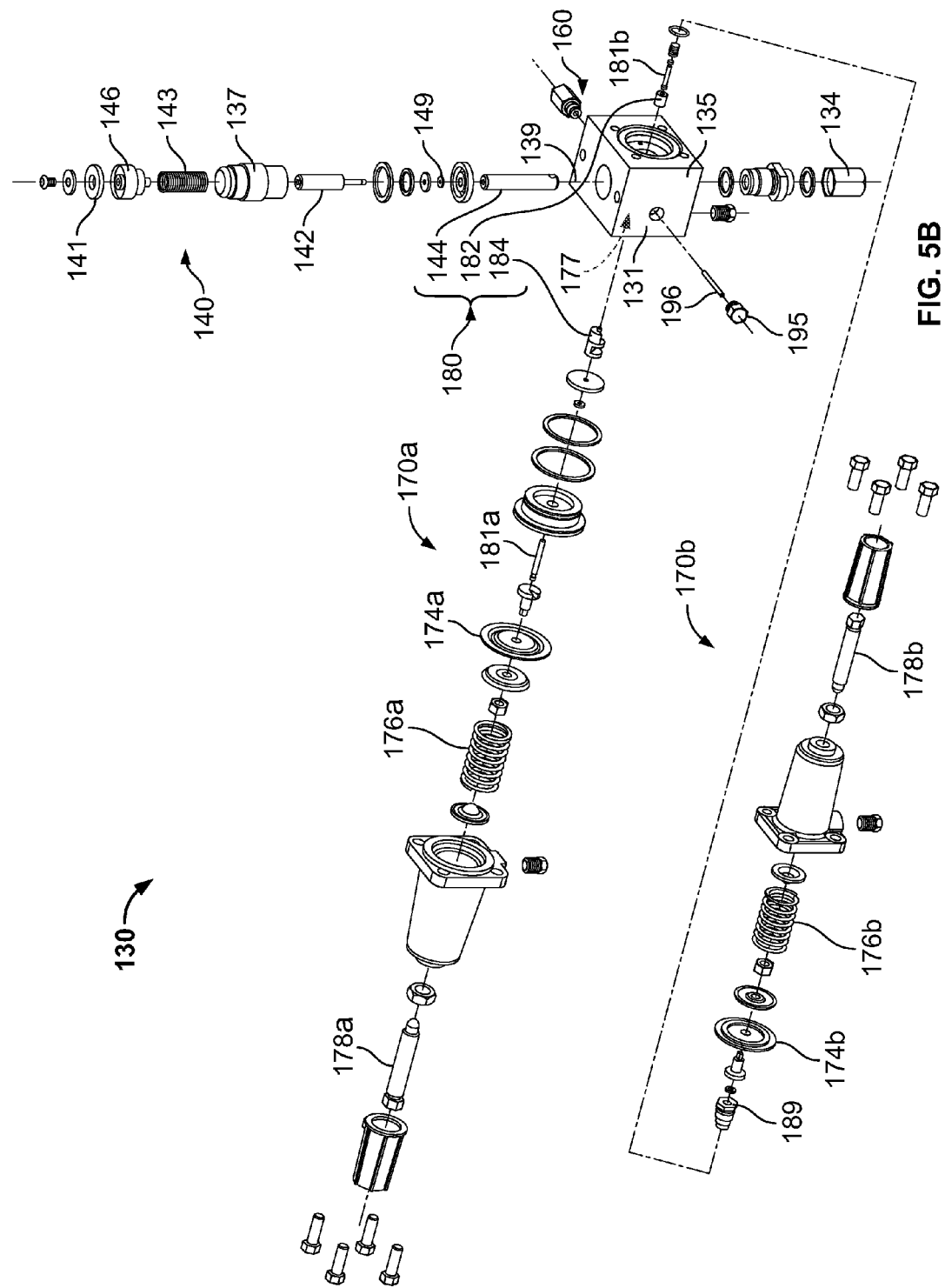
FIG. 5B is an exploded perspective view of the shutoff actuator assembly of FIG. 5A.

Referring now to FIGS. 5A-5B, the actuator assembly 130 may include a number of components that are assembled together to provide the plug assembly 140 and the sensor assembly 160 (which includes the pressure sensing assemblies 170a-b and the trigger assembly 180). In this embodiment, the sense diaphragms 174a and 174b of the first and second pressure sensing assemblies 170a-b are each biased by an adjacent spring 176a or 176b, respectively. As such, the sense diaphragms 174a-b are both urged toward the central region 177 of the housing 131 that contains the trigger mechanism 180. For example, the first and second sense diaphragms 174a-b are both biased to flex toward a portion of the central axis 139 of the plug assembly that passes through the housing 131. In some embodiments, the location of the springs 176a and 176b outside of the diaphragms 174a and 174b, respectively, simplifies the process for servicing, replacing, or adjusting the springs 176a and 176b. For example, the first spring 176a may be replaced or adjusted without disassembling the first diaphragm 174a from the housing 131. Likewise, the second spring 176b may be replaced or adjusted without disassembling the second diaphragm 174b from the housing 131.

In some embodiments, the diaphragms 174a and 174b at least partially defined a wall of the corresponding sense chambers 172a and 172b, respectively. Thus, the fluid pressure in the first sense chamber 172a acts against the first diaphragm 174a to counter the force from the first compression spring 176a. Thus, if there is a change in pressure in the first sense chamber 172a to an underpressure condition (e.g., below a minimum setpoint), the diaphragm 174a will flex accordingly under the force of the first spring 176a and thereby shift the position of the trigger member 182. Similarly, the fluid pressure in the second sense chamber 172b acts against the second diaphragm 174b to counter the force from the second compression spring 176b. If there is a change in pressure in the second sense chamber 172b to an overpressure condition (e.g., above a maximum setpoint), the diaphragm 174b will flex accordingly to further compress the second spring 176b and thereby shift the position the trigger member 182. As described in more detail below, the bias applied by the springs 176a and 176b can be adjusted independently using adjusting screws 178a and 178b, respectively, which thereby permits adjustment of the maximum and minimum setpoints for the trigger assembly 180.

Optionally, as shown in FIG. 5A, the actuator assembly 130 can be equipped with a viewing window 134 that provides an externally visible indicator of the trigger assembly 180 releasing the plug assembly 140 to move to the closed position. The viewing window 134 may be a removably cap that is generally transparent so that a lower portion of the plug assembly 140 (e.g., a lower end of a reset shaft 144) is viewable to a user positioned near the actuator assembly. When the trigger assembly 180 is activated to release the plug assembly 140 to travel toward the closed position (and thereby shutoff the fluid flow), the portion of the plug assembly 140 that is viewable through the window cap 134 will correspondingly change. As such, a user can readily identify if the shutoff valve system 100 has been previously triggered to a closed position, which may be subsequently reset to restore normal fluid flow.

Referring now to FIGS. 6A-6B, some embodiments of the actuator assembly 130 include the trigger assembly 180 that retains the plug assembly 140 in the first (open) position (FIG. 6A) during periods in which the fluid flows from the inlet 112 to the outlet 114. In the event where a sensed pressure (e.g., in at least one of the sense chambers 172a-b shown in FIG. 3) falls out of a predetermined range, the trigger assembly 180 of the actuator assembly 130 can release the plug assembly 140 to quickly travel in a linear path until a plug seal 141 coupled on the distal end of a plug member 146 comes into contact with the seat 118 in the chamber 116 (FIG. 6B). When the plug assembly 140 is in the first position (FIG. 6A), pressurized fluid from a source can flow into the inlet 112 (depicted by arrow 113), through an opening in the seat 118 and into the regulator assembly 105, which can help to control the pressure of the gas. After passing through the regulator assembly 105, the gas can then pass through the outlet 114 (depicted by arrow 115). While the regulator assembly may be able to control the pressure of the gas during normal operation, in some cases it may be preferable to stop the flow of gas to the outlet 114. In such circumstances, the actuator assembly 130 can be used to automatically block the fluid flow between the inlet 112 and the outlet 114 in response to detection of any of an underpressure condition and an overpressure condition.

The plug assembly 140 can include a main shaft 142 that is threadably coupled to the plug member 146 and located radially inward of a spring housing 137 fixed to an actuator assembly housing 135. A main spring 143 can be located axially inward of the spring housing 137 and axially outward of the main shaft 142. The main spring 143 can be compressed between the spring housing 137 and an underside of the plug member 146 such that the spring can exert a force against the plug member 146 and thus bias the plug member 146 toward the closed position depicted in FIG. 6B. In this configuration, the plug member 146 can include an outer rim 147 and an inner rim 148, both of which slidably engage with the spring housing 137. In particular, an outer cylindrical surface of the inner rim 148 slidably engages with the inner cylindrical surface of the spring housing 137, and the inner cylindrical surface of the outer rim 147 slidably engages with the outer cylindrical surface of the spring housing 137. As such, the plug member 146 can slide axially relative to the spring housing 137 while also maintaining a mechanical seal between the inlet 112 and the interior of the spring housing 143. For example, when the plug assembly 140 is in the opened position and fluid is flowing through the system 100 (FIG. 6A), the outer rim 147 of the plug member contacts the exterior of the spring housing 137 and the inner rim 148 contacts the interior of the spring housing 137 to thereby provide a seal that hinders migration of water and debris into the interior of the spring housing 137. This feature can reduce the possibility of debris, water, or ice building up in the interior of the spring housing 137 and causing the spring 143 to seize or otherwise fail.

As shown in FIG. 6A, the plug assembly 140 can be biased toward the closed position by the spring 143 while being retained in the open position by at least a portion of the trigger assembly 180 (discussed in greater detail below). The plug assembly 140 can include a reset shaft 144 that is threadably coupled to the main shaft 142 and located in a cylindrical chamber such that the reset shaft 144 is limited to movement in the axial direction. In some embodiments, the plug assembly 140 can be retained in the open position (FIG. 6A) by retaining the reset shaft 144 with a trigger mechanism. For example, a portion of the trigger assembly 180 can restrict the movement of the reset shaft 144 in the axial direction toward the closed position. When the trigger assembly 180 no longer restricts the movement of the reset shaft 144 (e.g., when an overpressure or underpressure situation is sensed), the attached main shaft 142 and the remainder of the plug assembly 140 can transition to the closed position (FIG. 6B). Because the force of the spring 143 can maintain the plug assembly 140 in the closed position, the plug seal 141 will remain sealed against the seat 118 so as to prevent fluid flow through the valve system 100. In the event that fluid flow should be restored, a downward force can be applied to the reset shaft 144 to overcome the bias of the spring 143 and transition the plug assembly 140 from the closed position to the open position. The process of resetting the valve system is describe din more detail below.

In some embodiments, the valve system 100 may operate for long periods of time in the open position (FIG. 6A) without transitioning the plug assembly 140 to the closed position (FIG. 6B). In order to reduce the likelihood of a high breakout friction or any other failure that could be caused by an o-ring seal, the stroking components of the plug assembly (the main shaft 142, the reset shaft, and the plug member 146) may be engaged by only a single, small o-ring 149 that slidably engages a smaller diameter portion of the main shaft 142. As such, the surface area of the interface between the o-ring 149 and the main shaft 142 is reduced, leading to less friction between the o-ring 149 and the stroking components of the plug assembly 140 in the event that the plug assembly 140 is force in the linear path to the closed position (FIG. 6B).

Still referring to FIGS. 6A-6B, the trigger assembly 180 can include features that can maintain the plug assembly 140 in the open position and can adjust so as to release the plug assembly 140 to transition to the closed position. For example, the trigger assembly 180 can include a rotator shaft 184 and the trigger member 182 that can work together to maintain the plug assembly 140 in the open position until a downstream pressure event is detected. In some examples, the rotator shaft 184 comprises a half moon head that is rotatable such that when it is in the position depicted in FIG. 6A, the half moon head abuts with an upper flat surface of the reset shaft 144 to restrict movement of the plug assembly 140 in the axial direction toward the closed position. The trigger member 182 can operate as a trigger shaft that moves away from the rotator shaft 184 (in response to either one of the sensing assemblies 170a-b (FIG. 3)) to thereby permit a pivot rotation of the rotator shaft 184 and a release of the plug assembly 140 (FIG. 6B). In some embodiments, the rotator shaft 184 and the trigger shaft 182 can be contained such that their degrees of freedom are limited. For example, they can be configured such that they are round shafts contained within cylindrical, slide-fit chambers. This configuration can advantageously reduce the effect damage due to heavy use, vibration, and the like. As will be described in greater detail below in connection with FIG. 7, the bias of the spring 143 tends to urge the plug assembly 140 toward the axial direction toward the seat 118.

When the rotator shaft 184 is in the position depicted in FIG. 6A, the upper flat surface of the reset shaft 144 abuts with a portion of the rotator shaft 184, which encourages the rotator shaft 184 to rotate about its axis (e.g., clockwise in the view of FIG. 6B), as depicted by arrow 185. However, the trigger member 182 can be positioned to impede the rotation of the rotator shaft 184 and thereby oppose the torque being applied from the reset shaft 144. In this way, the trigger member 182, which can slide perpendicular to the plug assembly 140 (e.g., out of the page in the view of FIG. 6B), impedes the rotation of the rotator shaft 184, which in turn retains the plug assembly 140 in the open position (FIG. 6A). In some embodiments, movement of the trigger member 182 along its axis (e.g., out of the page as depicted in FIG. 6B) can free the rotator shaft 184 to rotate clockwise, which in turn can allow the plug assembly 140 to quickly transition to the closed position under the force of the main spring 143. As will be described in more detail below in connection with FIGS. 8, 9A-9C, movement of the trigger member 182 can be accomplished by components of the pressure sensing assemblies 170a and 170b.

Referring now to FIG. 7, the trigger assembly 180 can provide a force reduction configuration that substantially reduces the amount of force required to move the trigger member 182. In particular, the amount of normal force between the rotator shaft 184 and the trigger member 182 is substantially less than the amount of normal force between the rotator shaft 182 and the reset shaft 144. As such, the amount of force provided by the sensing assembly 170a or 170b that is required to overcome the friction between the rotator shaft 184 and the trigger member 182 is significantly reduced, thereby permitting the pressure sensing assemblies to actuate the trigger member 182 with increased sensitivity.

In some embodiments, the plug assembly 140 includes the spring 143 that biases the plug assembly 140 toward the closed position. The spring 143 can be chosen such that the spring force is high enough (e.g., 20-25 lbs-force in this embodiment) to achieve a bubble tight shutoff rating, thus minimizing the passage of gas from the inlet 112 to the outlet 114 after an overpressure or underpressure condition is sensed. In some embodiments, it may be advantageous to configure the valve system 100 such that the force required to retain the plug assembly 140 in the open position is lower than the spring force that urges the plug assembly toward the closed position. For example, to retain the plug assembly 140 in the open position, the rotator shaft 184 may apply a force to the reset shaft 144 that is equal and opposite in direction to the force applied to the plug assembly 140 by the spring 143. Since the rotator shaft 184 is translationally fixed and free to rotate, a torque is applied to the rotator shaft 184 by the reset shaft 144. To keep the rotator shaft 184 from rotating and thus maintaining the reset shaft 144 in place, an equal but opposite torque can be applied to the rotator shaft 184 by the trigger member 182.

As shown in FIG. 7, a distance 145 from a center axis 186 of the rotator shaft 184 to the closest portion of the interface between the reset shaft 144 and the rotator shaft 184 is shorter than a distance 187 between the center axis 186 and the interface between the rotator shaft 184 and the trigger shaft 182. These differences between the two distances 145 and 186 can provide a mechanical advantage in that the trigger member 182 bears a lower force (at the interface with the rotator shaft 184) as compared to the force borne at the interface of the reset shaft 144 and the rotator shaft 184. In this way, less force can be applied by the trigger shaft 182 to the rotator shaft 184 than is applied by the reset shaft 144 to the rotator shaft 184 to keep the rotator shaft 184 from rotating. In some embodiments, the valve system 100 is designed such that the force applied by the trigger shaft 182 is 25% that of the force applied by the reset shaft 144. The reduction in force between the trigger shaft 182 and the rotator shaft 184 can decrease friction when the trigger shaft is moved relative to the rotator shaft 184 (e.g., when a shutoff condition is triggered), which can reduce wear on components of the trigger assembly 180 and the pressure sensing assemblies 170a and 170b. This advantageously increases the accuracy, durability and reliability of the trigger assembly 180 and the pressure sensing assemblies 170a and 170b.

In some embodiments, the trigger assembly 180 can allow the plug assembly 140 to transition to the closed position by moving the trigger shaft 182 out of the rotational path of the rotator shaft 184. Features of the valves system 100 can advantageously be configured such that the force required to move the trigger shaft 182 is reduced. For example, the actuation movement of the trigger shaft 182 can be in a path that is substantially parallel to the axis 186 of the rotator shaft 184. As will be described in greater detail below in connection with FIG. 9, the trigger shaft 182 can be moved out of the rotational path of the rotator shaft 184, allowing it to rotate and the plug assembly 140 to transition to the closed position. In some embodiments, the trigger shaft 182 is cylindrical in shape and is positioned such that a corner edge 188 of the rotator shaft 184 is in contact with a thin linear surface portion on the trigger shaft 182. Configuring the trigger shaft 182 and rotator shaft 184 in such a way reduces the friction between the trigger shaft 182 and the rotator shaft 184 such that the force needed to move the trigger shaft 182 out of the rotational path of the rotator shaft 184 is reduced. Also, because the friction interface between the trigger shaft 182 and the rotator shaft 184 is minimized (e.g., the interface may be a single line), wear can be reduced on these components. This can increase the life cycle of the valve system 100. In some embodiments, when the valve system 100 goes through a high number of open-close cycles, the valves system 100 can be renewed by replacing a minimum number of easily serviceable components (e.g., the rotator shaft 184 and the trigger shaft 182).

Figure 8:
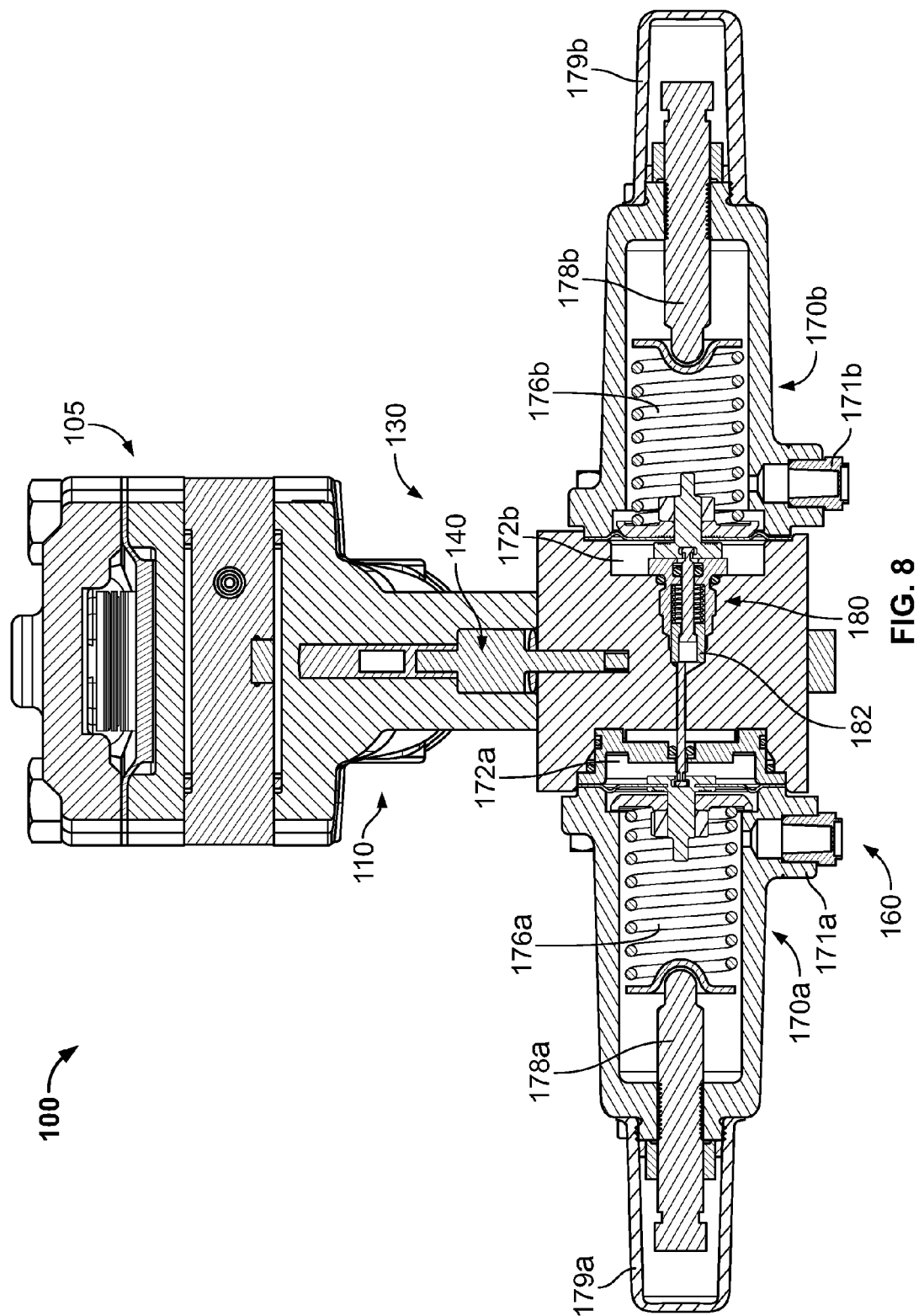
FIG. 8 is another cross-sectional view of the shutoff valve system of FIG. 1.

Referring now to FIG. 8, valve system 100 can be configured so that a user can customized the overpressure and underpressure set points for the pressuring sensing assemblies 170a-b. In some embodiments, when a sensed pressure is within a selected range of pressures (e.g., between the minimum and maximum setpoints), the plug assembly remains in the open position to allow fluid flow between the inlet 112 and the outlet 114 (FIG. 2). When the sensed pressure falls below or rises above the predetermined range, the valve system 100 can quickly shutoff, stopping the flow of gas between the inlet 112 and the outlet 114. The set points bounding this range of pressures can be adjusted using the adjusting screws 178a and 178b. As described previously, the sense chamber 172a, the diaphragm 174a, and the like can sense an underpressure situation and trigger the plug assembly 140 to snap to the closed position. The adjusting screw 178a can be used adjust the minimum setpoint below which the plug assembly 140 will close. Likewise, the chamber 172b, the diaphragm 174b, and the like can sense an overpressure situation and trigger the plug assembly 140 to snap to the closed position. The adjusting screw 178b can be used adjust the maximum setpoint above which the plug assembly 140 will close. In this way, overpressure and underpressure situations can be sensed independently and the pressures that define these situations can be adjusted independently. In use, an operator can remove caps 179a and 179b to access adjusting screws 178a and 178b. The force applied by the springs 176a and 176b on the diaphragms 174a and 174b, respectively, can be adjusted by turning in (to increase the force) or turning out (to decrease the force). Adjusting the force applied by the springs 176a and 176b can adjust the pressure range set points. For example, turning in the adjusting screw 178a can increase the force applied by the spring 176a on the diaphragm 174a. Increasing this force has the effect of raising the lower threshold of the pressure range. Conversely, turning out the adjusting screw will lower the lower threshold of the pressure range. Independently of the lower threshold limit, the adjusting screw 178b can be turned in or out to raise or lower the upper threshold limit of the pressure range, respectively.

In some embodiments, the minimum and maximum setpoints for the pressure sensing assemblies 170a-b can be set remotely without necessarily using the adjustment screws 178a-b. For example, the pressure sensing assembly 170a can include fluid access port 171a. Fluid access port 171a can fluidly connect an interior space behind the diaphragm 174a to, for example, ambient air, pressurized air, a vacuum, and the like. When the access port 171a is vented to ambient air, substantially the only biasing force acting on the diaphragm 174a is from the spring 176a. As described previously, this force can be adjusted by turning the adjusting screw 178a. In some embodiments, the access port 171a can be connected to a pressure source, a vacuum source, and the like. Pressurizing the interior space behind the diaphragm 174a has the effect of raising the lower threshold of the pressure range. Conversely, pulling a vacuum from the interior space behind the diaphragm 174a can lower the lower threshold of the pressure range. Independently of the lower threshold limit, an access port 171b can be used to supply pressure or vacuum to the interior space behind the diaphragm 174b so as to raise or lower the upper threshold limit of the pressure range, respectively. In some embodiments, equipment required to supply pressure to or to pull a vacuum from the ports 171a and 171b can be communicated from a remote site, thereby allowing a user to adjust the maximum and minimum setpoints of the pressure sensing assemblies from a remote location (e.g., using a computer control system in a service station).

Referring now to FIG. 6B, 9A-9C, in some embodiments, the sensor assembly 160 can sense overpressure and underpressure conditions and thereafter trigger the plug assembly 140 to shutoff the valve system 100. The trigger assembly 180 can include a trigger sleeve 189 that remains stationary and can at least partially contain and restrict the movement of the trigger shaft 182 (e.g., permitting movement in an axial direction) and a trigger spring 183 to bias the trigger shaft 182 into the rotational path of the rotator shaft 184. As described previously, the sensor assembly 160 can stop the flow of gas through the body assembly 110 by causing the plug assembly 140 to snap to the closed position. In some embodiments, this can be accomplished by sliding the trigger shaft 182 out of the rotational path of the rotator shaft 184, thus allowing the rotator shaft 184 to rotate about an axis. To slide the trigger shaft 182, an axial force can be applied to the trigger shaft 182 to overcome the forces biasing the shaft 182 into the rotational path of the rotator shaft 184 (e.g., the force of the spring 183, the force due to friction caused by contact of the rotator shaft 184 with the trigger shaft 182, and the like). Once the rotator shaft 184 is free to rotate, the biasing force supplied by the plug spring 143 can cause the plug assembly 140 to quickly move to the closed position.

Figure 9B:
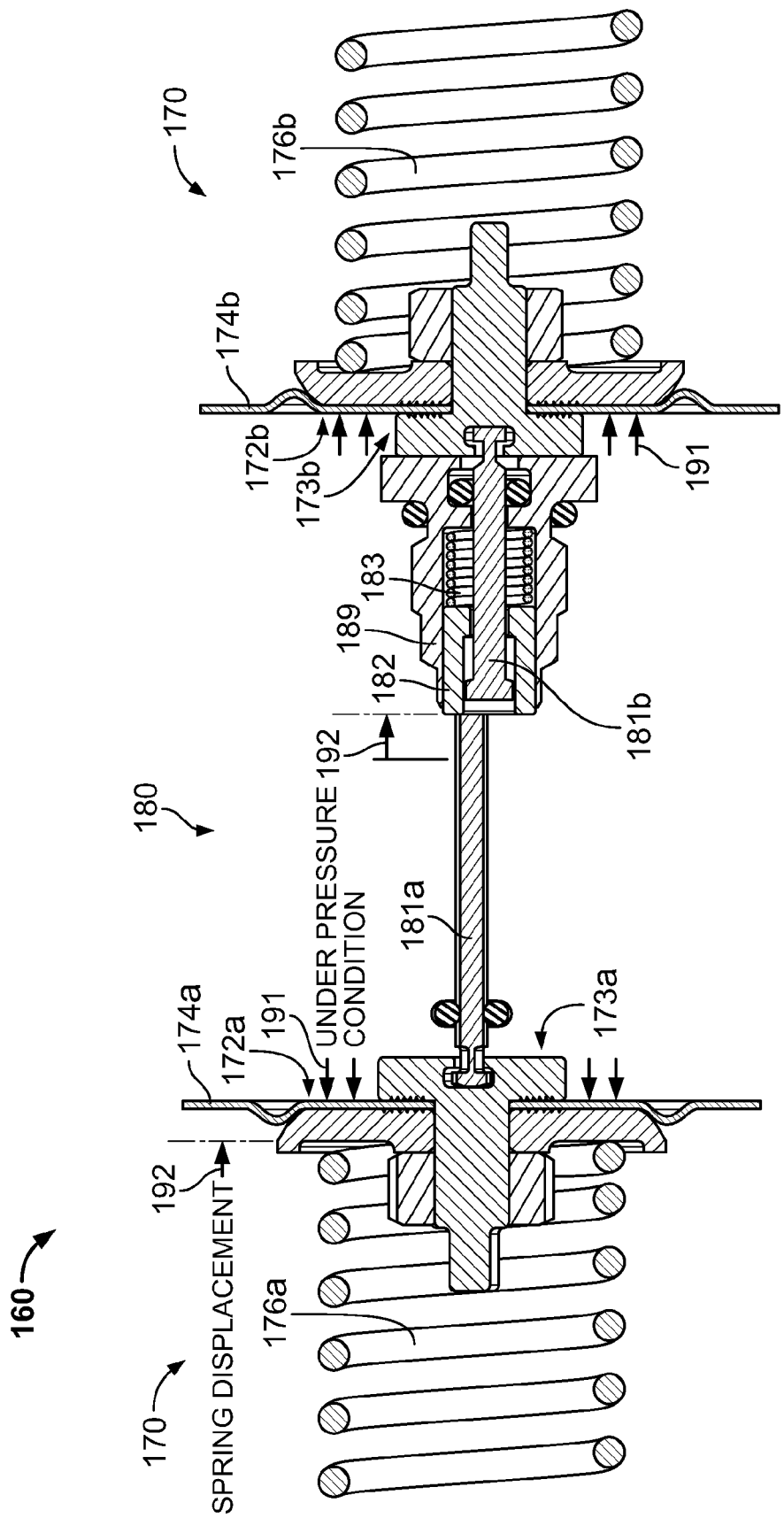
FIG. 9B is a cross-sectional view of a pressure sensing assembly of the shutoff valve system of FIG. 1, with the actuator in a second position due to an underpressure condition.

Referring now to FIG. 9B, in some embodiments, the trigger shaft 182 can be moved out of the rotational path of the rotator shaft 184 based on an underpressure condition (e.g., as sensed by the pressure sensing assembly 170a). For example, the pressure sensing assembly 170a can include the diaphragm 174a for sensing a pressure within a fluid system, the spring 176a for biasing the diaphragm 174a, and a diaphragm connector assembly 173a for coupling the diaphragm 174a to a portion of the trigger assembly 180. For example, the diaphragm 174a can be configured so as to sense an underpressure situation in a sensed portion of the fluid system. As the sensed pressure (e.g., the pressure depicted by arrows 191) decreases, the spring 176a can expand, shifting the connector assembly 173a toward the trigger sleeve 189. The connector assembly 173a can be coupled to a push rod 181a, which abuts an axial face of the trigger shaft 182. Thus, movement in the assembly 173a is transferred to the push rod 181a causing it to translate the trigger shaft 182 into the housing 189. For example, when the sensed pressure in the sense chamber 172a falls below a predetermined threshold limit, the spring 176a can expand a length 192, leading to an equivalent movement of the trip pin 181a in the direction of the housing 189. This movement can translate the trigger shaft 182 into the housing 189 and out of the rotational path of the rotator shaft 184, thus allowing the valve system 100 to snap shut. Because the pressure sensing assemblies 170a and 170b can work independently to actuate the trigger member 182 in the same direction, the underpressure condition may have little or no effect on the pressure sensing assembly 170b, the high-pressure trip pin 181b, and the like.

Figure 9C:
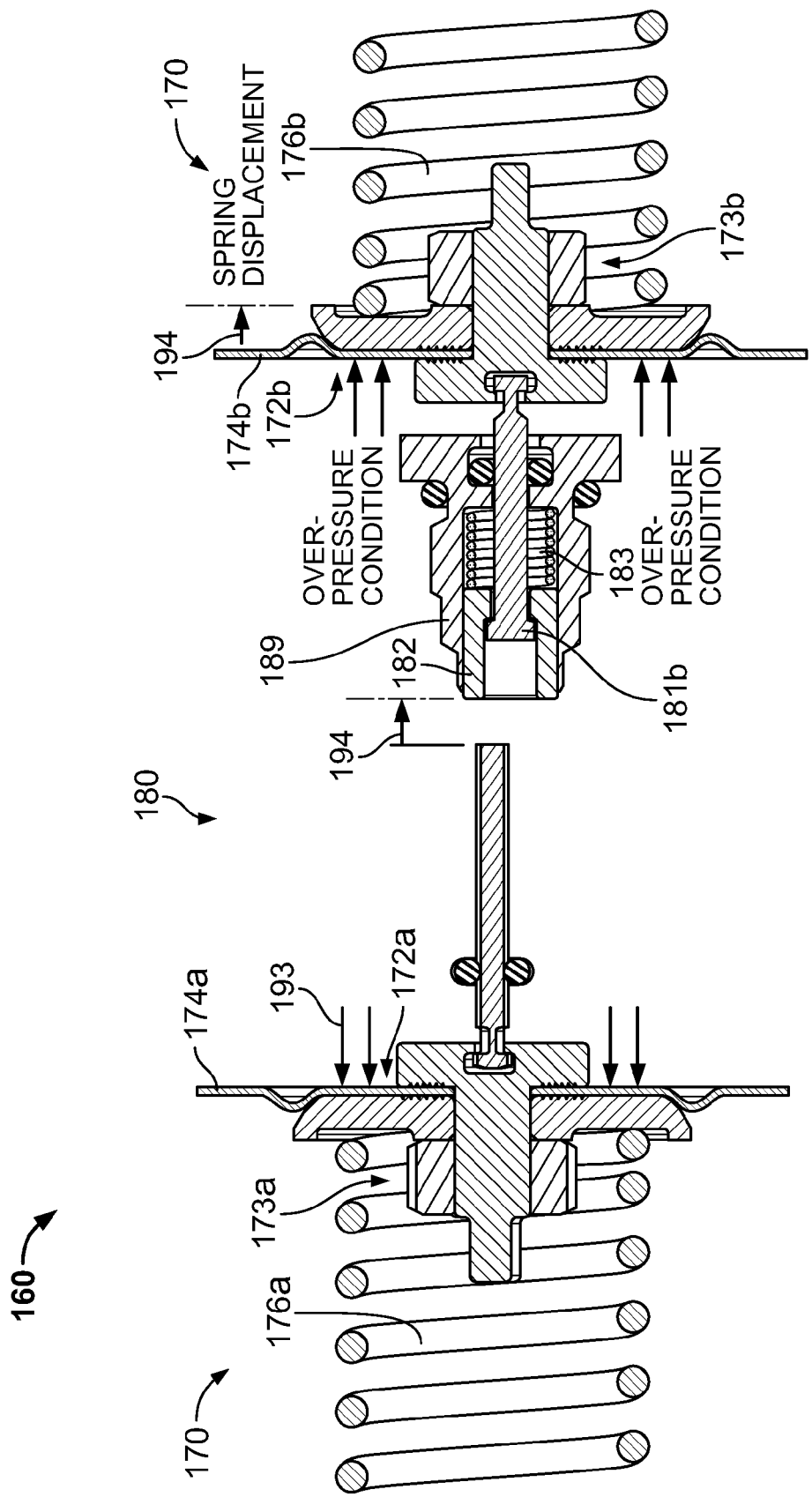
FIG. 9C is a cross-sectional view of a pressure sensing assembly of the shutoff valve system of FIG. 1, with the actuator in the second position due to an overpressure condition.

Referring now to FIG. 9C, in some embodiments, the trigger shaft 182 can be moved out of the rotational path of the rotator shaft 184 based on an overpressure condition (e.g., as sensed by the pressure sensing assembly 170b). For example, the pressure sensing assembly 170b can include the diaphragm 174b for sensing a pressure within a fluid system, the spring 176b for biasing the diaphragm 174b, and a diaphragm connector assembly 173b for coupling the diaphragm 174b to a portion of the trigger assembly 180. For example, the diaphragm 174b can be configured so as to sense an overpressure situation in a sensed portion of the fluid system. As the pressure in the sense chamber 172b (e.g., the pressure depicted by arrows 193) increases, the spring 176b can contract, shifting the connector assembly 173b away from the trigger housing 189. The connector assembly 173b can be coupled to a pull rod 181b, which is coupled to the trigger shaft 182. Thus, movement in the assembly 173b is transferred to the pull rod 181b causing it to translate the trigger shaft into the housing 189. For example, when the sensed pressure rises above a predetermined threshold limit, the spring 176b can compress a length 194, leading to an equivalent movement of the trip pin 181a in the direction of the housing 189. This movement can translate the trigger shaft 182 into the housing 189 and out of the rotational path of the rotator shaft 184, thus allowing the valve system 100 to snap shut. Because the pressure sensing assemblies 170a and 170b can work independently to actuate the trigger member 182 in the same direction, the overpressure condition may have little or no effect on the pressure sensing assembly 170a, the push rod 181a, and the like.

After the trigger member 182 is actuated to slide further into the sleeve 189, the rotator shaft 184 is free to rotate (as shown in FIG. 6B) so that the plug assembly 140 can move in the linear path toward the closed position. In some embodiments, the shutoff valve system 100 can be reset after it is slammed shut. In particular embodiments, the valve system can be reset by an individual worker by simply removing only three different caps (e.g., the valve body 110 and actuator assembly 130 can remain assembled together in the fluid system piping).

For example, referring again to FIGS. 4, 5A and 5B, the shutoff valve system 100 can be reset by removing a first cap 106 (FIG. 4), exposing a bleed shaft 107. The bleed shaft 107 can be pressed allowing pressurized gas within the regulator assembly 105 to escape. Thereafter, the first cap can be reattached. Next, a second cap 134 (the viewing window cap 134 sown in FIGS. 5A-B) can be removed to provide access to the reset shaft 144. The user can pull down on the reset shaft 144 so as to return the reset shaft 144 to the lower position illustrated in FIG. 6A. While the reset shaft 144 is held in the lower position, a third cap 195 (FIG. 5B) can be removed so that the user can press a reset pin 196 (which returns the rotator shaft 184 to the position shown in FIG. 6A to retain the reset shaft in the lower position). After the rotator shaft 184 is in this configuration, the trigger shaft 182 will be returned to the rotational path of the rotator shaft 184 by the reset spring 183 (FIG. 9A), thus resetting the valve system 100 and returning it to the open position.

A number of embodiments of the invention have been described. Nevertheless, it will be understood that various modifications may be made without departing from the spirit and scope of the invention. Accordingly, other embodiments are within the scope of the following claims.

What is claimed is:

1. A shutoff valve system for a fluid flow system, comprising:
    a fluid flow path at least partially defined by an inlet and an outlet;
    a plug assembly that is biased, the plug assembly configured to adjust from a first position in which the fluid flow path is open to a second position in which the fluid flow path is closed; and
    a trigger mechanism that is configured to move in response to a pressure condition, the trigger mechanism comprising a rotator shaft and a trigger shaft configured to impede rotation of the rotator shaft, each of the rotator shaft and the trigger shaft having a center axis that are parallel to one another, the rotator shaft configured to contact the plug assembly at a first interface and to contact the trigger shaft at a second interface
    wherein the plug assembly is configured to automatically adjust from the first position to the second position in response to movement of the rotator shaft.

2. The shutoff valve system of claim 1, further comprising a seat positioned along the fluid flow path, wherein the plug assembly is movable along a generally linear path from the first position to the second position for closing the fluid flow path, wherein the plug assembly comprises a plug head to mate with the seat when the plug assembly is moved to the second position and at least one shaft coupled to the plug head, and wherein only a single ring seal member engages with the entire plug assembly.

3. The shutoff valve system of claim 1, further comprising:
a regulator body that defines at least a portion of the fluid flow path between the inlet and the outlet,
wherein the plug assembly and trip mechanism are housed together in a slam shut valve assembly, and wherein the entire slam shut valve assembly is removably coupled to the regulator body using only two mounting bolts.

4. A shutoff valve system, comprising:
a fluid flow path at least partially defined by an inlet and an outlet;
a seat positioned along the fluid flow path;
a plug assembly that is biased, the plug assembly configured to adjust from a first position in which the fluid flow path is open to a second position in which the fluid flow path is closed, the plug assembly comprising a plug head to mate with the seat when the plug assembly is in the second position, a spring housing having an inner cylindrical surface portion and an outer cylindrical surface portion, and a spring at least partially positioned in the spring housing; and
a trip mechanism having a trigger member that is configured to move in response to a pressure condition,
wherein the plug assembly is configured to automatically adjust from the first position to the second position in response to movement of the trigger member, and
wherein the plug head is configured to slidably engage with both the inner and outer cylindrical surface portions of the spring housing.

5. The shutoff valve system of claim 4, wherein trigger member is configured to move in the same direction in response to an underpressure condition and in response to an overpressure condition.

6. The shutoff valve system of claim 4, wherein the trigger member is coupled to a first sensing diaphragm and a second sensing diaphragm, and wherein the plug assembly is configured to automatically move in a linear path from the first position to the second position in response to an underpressure condition on the first sensing diaphragm and in response to an overpressure condition on the second sensing diaphragm.

7. The shutoff valve system of claim 4, wherein the trip mechanism is configured to retain the plug assembly in the first position, wherein, in response to a downstream fluid pressure condition, the trip mechanism is configured to release the plug assembly to travel in a linear path from the first position to the second position, wherein the trip mechanism comprises the trigger member and a rotator shaft that is pivotable about a pivot axis, and wherein the trigger member is movable relative to the rotator shaft.

8. The shutoff valve system of claim 7, wherein at least a first shaft portion of the plug assembly contacts the rotator shaft to urge the rotator shaft to pivot while the trigger member contacts the rotator shaft to resist rotation of the rotator shaft, and wherein the trigger member moves away from the rotator shaft in response to the downstream pressure condition so that the trip mechanism releases the plug assembly to move in a linear path from the first position to the second position.

9. The shutoff valve system of claim 4, wherein the plug assembly is biased to move in a longitudinal direction from the first position to the second position for closing the fluid flow path, wherein the system further comprises first and second sense diaphragms positioned in a lateral direction relative to the trigger member such that the trigger member is positioned generally laterally between the first and second sense diaphragms.

10. The shutoff valve system of claim 9, further comprising a first compression spring and a second compression spring, wherein the first compression spring is positioned laterally outside of the first sense diaphragm and opposite of the trigger member such that the first compression spring biases the first sense diaphragm toward the trigger member, and wherein the second compression spring is positioned laterally outside of the second sense diaphragm and opposite of the trigger member such that the second compression spring biases the second sense diaphragm toward the trigger member.

11. The shutoff valve system of claim 4, further comprising a viewing window that is configured to provide an externally visible indicator of the trip mechanism releasing the plug assembly to move to the second position.

12. A shutoff valve system for a fluid flow system, comprising:
a fluid flow path at least partially defined by an inlet and an outlet;
a plug assembly that is biased, the plug assembly comprising a plug, a main shaft coupled with the plug, and a reset shaft coupled with the main shaft, the plug configured to move in a linear path from a first position in which the fluid flow path is open to a second position in which the fluid flow path is closed;
a trigger mechanism comprising a rotator shaft and a trigger shaft configured to impede rotation of the rotator shaft, each of the rotator shaft and the trigger shaft having a center axis that are parallel to one another, the rotator shaft configured to contact the plug assembly at a first interface and to contact the trigger shaft at a second interface; and
a sensor assembly in communication with the trigger member, the sensor assembly having a first sensing diaphragm and a second sensing diaphragm, each coupled with the trigger shaft,
wherein the trigger shaft is configured to release the rotator shaft to allow the plug to automatically move in the linear path from the first position to the second position in response to an underpressure condition on the first sensing diaphragm, and
wherein the trigger shaft is configured to release the rotator shaft to allow the plug to automatically move in the linear path from the first position to the second position in response to an overpressure condition on the second sensing diaphragm.

13. The shutoff valve system of claim 12, wherein the inlet and the outlet are configured to be installed between a natural gas source and natural gas consuming equipment.

14. The shutoff valve system of claim 12, wherein the fluid flow path between the inlet and the outlet is at least partially defined by a regulator assembly and a body assembly, and wherein the regulator assembly includes a diaphragm that regulates fluid flow between the inlet and the outlet.

15. The shutoff valve system of claim 12, wherein the center axis of the rotator shaft is spaced apart from the first interface by a distance that is less than the distance from the center axis of the rotator shaft to the second interface.

16. A valve system to shutoff fluid flow in a fluid flow system, comprising:

a fluid flow path at least partially defined by an inlet and an outlet;

a plug assembly comprising a plug, a shaft coupled with the plug, and a spring that is configured to bias the plug to move in a linear path from a first position in which the fluid flow path is open to a second position in which the fluid flow path is closed; and a trigger mechanism that is configured to retain the plug in the first position and, in response to a downstream fluid pressure condition, is configured to release the plug to travel in the linear path from the first position to the second position, wherein the trigger mechanism comprises a rotator shaft and a trigger shaft configured to impede rotation of the rotator shaft, each of the rotator shaft and the trigger shaft having a center axis that are parallel to one another, the rotator shaft configured to contact the plug assembly at a first interface and to contact the trigger shaft at a second interface, wherein at, the first interface, the plug assembly contacts the rotator shaft to urge the rotator shaft to pivot while the trigger shaft contacts the rotator shaft to resist rotation of the rotator shaft, and wherein the trigger shaft is configured to move away from the rotator shaft in response to the downstream pressure condition so that the trip mechanism releases the plug to move in the linear path from the first position to the second position.

17. The valve system of claim 16, wherein the inlet and the outlet are configured to be installed between a natural gas source and natural gas consuming equipment.

18. The valve system of claim 16, wherein the fluid flow path between the inlet and the outlet is at least partially defined by a regulator assembly and a body assembly, and wherein the regulator assembly includes a diaphragm that regulates fluid flow between the inlet and the outlet.

19. The valve system of claim 16, wherein the center axis of the rotator shaft is spaced apart from the first interface by a distance that is less than the distance from the center axis of the rotator shaft to the second interface.

20. A slam-shut valve assembly, comprising:
a plug assembly with a plug that is biased to move in a longitudinal direction from a first position to a second position for closing a fluid flow path;
a trigger mechanism positioned proximate to the plug assembly, the trigger mechanism being movable so as to release the plug to travel toward the second position in response to a sensed pressure condition, the trigger mechanism comprising a rotator shaft and a trigger shaft configured to impede rotation of the rotator shaft, each of the rotator shaft and the trigger shaft having a center axis that are parallel to one another, the rotator shaft configured to contact the plug assembly at a first interface and to contact the trigger shaft at a second interface;
first and second sense diaphragms positioned in a lateral direction relative to the trigger mechanism such that the trigger mechanism is positioned generally laterally between the first sense diaphragm and second sense diaphragm;
a first compression spring positioned laterally outside of the first sense diaphragm and opposite of the trigger mechanism such that the first compression spring biases the first sense diaphragm toward the trigger mechanism; and
a second compression spring positioned laterally outside of the second sense diaphragm and opposite of the trigger mechanism such that the second compression spring biases the second sense diaphragm toward the trigger mechanism.

21. The slam-shut valve assembly of claim 20, wherein the trigger mechanism is configured to move in the same direction both in response to an underpressure condition and in response to an overpressure condition.

22. The slam-shut valve system of claim 20, wherein the center axis of the rotator shaft is spaced apart from the first interface by a distance that is less than the distance from the center axis of the rotator shaft to the second interface.

23. A slam-shut valve system, comprising:
a fluid flow path at least partially defined by an inlet and an outlet;
a seat positioned along the flow path; and
a plug assembly that is biased to move from a first position in which the fluid flow path is open to a second position in which the fluid flow path is closed; and
wherein the plug assembly comprises:
a plug head to mate with the seat when the plug assembly is moved to the second position,
a spring holder member having an inner cylindrical surface portion and an outer cylindrical surface portion,
a spring at least partially positioned in the spring holder member,
wherein the plug head is configured to slidably engage with both the inner and outer cylindrical surface portions of the spring holder member,
wherein the fluid flow path between the inlet and the outlet is at least partially defined by a regulator assembly and a body assembly, and
wherein the regulator assembly includes a diaphragm that regulates fluid flow between the inlet and the outlet.

24. The slam-shut valve system of claim 23, wherein the inlet and the outlet are configured to be installed between a natural gas source and natural gas consuming equipment.

25. The shutoff valve system of claim 23, wherein the center axis of the rotator shaft is spaced apart from the first interface by a distance that is less than the distance from the center axis of the rotator shaft to the second interface.

26. A shutoff valve system for a fluid flow system, comprising:
a fluid flow path at least partially defined by an inlet and an outlet;
a seat positioned along the flow path; and
a linearly movable plug assembly that is configured to, in response to a downstream pressure condition, automatically adjust along a linear path from a first position in which the fluid flow path is open to a second position in which the fluid flow path is closed; and
a trigger mechanism configured to release the plug assembly to travel between the first position and the second position, the trigger mechanism comprising a rotator shaft and a trigger shaft configured to impede rotation of the rotator shaft, each of the rotator shaft and the trigger shaft having a center axis that are parallel to one another, the rotator shaft configured to contact the plug assembly at a first interface and to contact the trigger shaft at a second interface,
wherein the plug assembly comprises a plug head that is configured to mate with the seat when the plug assembly is moved to the second position and at least one shaft coupled to the plug head, and
wherein only a single ring seal member engages with the entire linearly movable plug assembly.

27. The shutoff valve system of claim 26, wherein the inlet and the outlet are configured to be installed between a natural gas source and natural gas consuming equipment.

28. The shutoff valve system of claim 26, wherein the fluid flow path between the inlet and the outlet is at least partially defined by a regulator assembly and a body assembly, and wherein the regulator assembly includes a diaphragm that regulates fluid flow between the inlet and the outlet.

29. The slam-shut valve assembly of claim 26, wherein the center axis of the rotator shaft is spaced apart from the first interface by a distance that is less than the distance from the center axis of the rotator shaft to the second interface.

30. A slam-shut valve system, comprising:
- a regulator body that defines a fluid flow path between an inlet and an outlet;
- a seat positioned along the flow path; and
- a slam shut valve assembly having a sensor assembly that is configured to detect a downstream pressure condition, a plug assembly that is configured to mate with the seat, and a trigger mechanism configured to release the plug assembly to travel between a first position and a second position, the trigger mechanism comprising a rotator shaft and a trigger shaft configured to impede rotation of the rotator shaft, each of the rotator shaft and the trigger shaft having a center axis that are parallel to one another, the rotator shaft configured to contact the plug assembly at a first interface and to contact the trigger shaft at a second interface,
- wherein, in response to the downstream pressure condition, the plug assembly is configured to automatically adjust from the first position in which the fluid flow path is open to the second position in which the fluid flow path is closed, and
- wherein the entire slam shut valve assembly is removably coupled to the regulator body using only two mounting bolts.

31. The slam-shut valve system of claim 30, wherein the inlet and the outlet are configured to be installed between a natural gas source and natural gas consuming equipment.

32. The slam-shut valve system of claim 30, wherein the fluid flow path between the inlet and the outlet is at least partially defined by a regulator assembly and a body assembly, and wherein the regulator assembly includes a diaphragm that regulates fluid flow between the inlet and the outlet.

33. A slam-shut valve assembly, comprising:
- a plug assembly that is biased to move in a longitudinal direction from a first position to a second position for closing a fluid flow path;
- a trigger mechanism that is configured to releasably engage with a component of the plug assembly, the trigger mechanism comprising a rotator shaft and a trigger shaft configured to impede rotation of the rotator shaft, each of the rotator shaft and the trigger shaft having a center axis that are parallel to one another, the rotator shaft configured to contact the plug assembly at a first interface and to contact the trigger shaft at a second interface, wherein, in response to a downstream pressure condition, the trigger mechanism is configured to automatically adjust to release the plug assembly move to the second position for closing the fluid flow path; and
- a viewing window that is configured to provide an externally visible indicator of the trip mechanism releasing the plug assembly to move to the second position.

34. The slam-shut valve assembly of claim 33, wherein the trigger shaft is configured to move in the same direction both in response to the downstream pressure condition being an underpressure condition and in response to downstream pressure condition being an overpressure condition.

\* \* \* \* \*